United States Patent

Okada

(10) Patent No.: US 9,703,731 B2
(45) Date of Patent: Jul. 11, 2017

(54) DATA TRANSFER APPARATUS AND DATA TRANSFER METHOD

(71) Applicant: SOCIONEXT INC., Yokohama-shi, Kanagawa (JP)

(72) Inventor: Masaki Okada, Owariasahi (JP)

(73) Assignee: SOCIONEXT INC., Yokohama (JP)

(*) Notice: Subject to any disclaimer, the term of this patent is extended or adjusted under 35 U.S.C. 154(b) by 45 days.

(21) Appl. No.: 14/746,570

(22) Filed: Jun. 22, 2015

(65) Prior Publication Data

US 2016/0004477 A1 Jan. 7, 2016

(30) Foreign Application Priority Data

Jul. 4, 2014 (JP) .................................. 2014-138712

(51) Int. Cl.
*G06F 3/00* (2006.01)
*G06F 13/16* (2006.01)
*G06F 5/14* (2006.01)
*G06F 13/28* (2006.01)
*G06F 5/12* (2006.01)
*G06F 13/38* (2006.01)

(52) U.S. Cl.
CPC ........... *G06F 13/1605* (2013.01); *G06F 5/12* (2013.01); *G06F 5/14* (2013.01); *G06F 13/28* (2013.01); *G06F 13/385* (2013.01); *G06F 2205/123* (2013.01); *G06F 2205/126* (2013.01)

(58) Field of Classification Search
None
See application file for complete search history.

(56) References Cited

U.S. PATENT DOCUMENTS

| | | | |
|---|---|---|---|
| 7,730,244 B1* | 6/2010 | Ansari | G06F 13/385 370/462 |
| 2003/0233527 A1* | 12/2003 | Kawasaki | H04W 52/0229 712/1 |
| 2004/0107265 A1* | 6/2004 | Yasunaga | G06F 13/1673 709/213 |

FOREIGN PATENT DOCUMENTS

| | | |
|---|---|---|
| JP | 11-242648 A | 9/1999 |
| JP | 2004-171209 A | 6/2004 |
| JP | 2006-243890 A | 9/2006 |

* cited by examiner

*Primary Examiner* — Henry Tsai
*Assistant Examiner* — Christopher Bartels
(74) *Attorney, Agent, or Firm* — Arent Fox LLP

(57) ABSTRACT

In a data transfer apparatus, a data coupling unit includes a command transfer unit that outputs a write address based on transfer requests input from a bus master, a judgment result indicating whether data corresponding to the input transfer requests are continues, and a judgment result indicating whether a size after coupling exceeds an arbitrary burst length. The data coupling unit includes a buffer unit that retains the data input from the bus master according to the write address, a buffer management unit that retains information used by the data coupling unit to couple the transfer requests, and a coupled command transfer unit that generates a transfer request after coupling, having a data size less than or equal to the arbitrary burst length and a start address based on the arbitrary burst length.

14 Claims, 30 Drawing Sheets

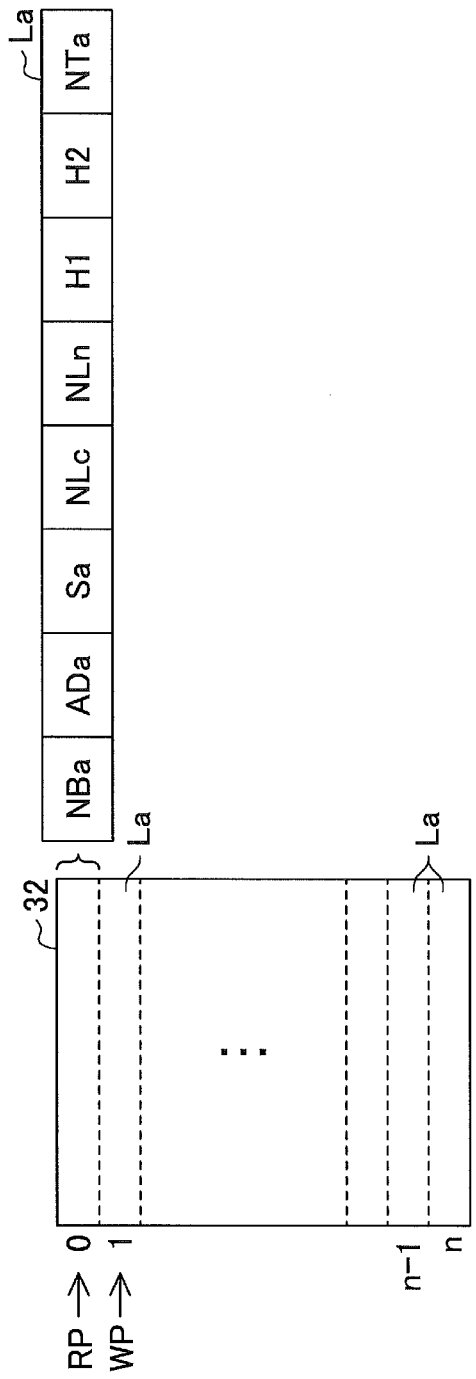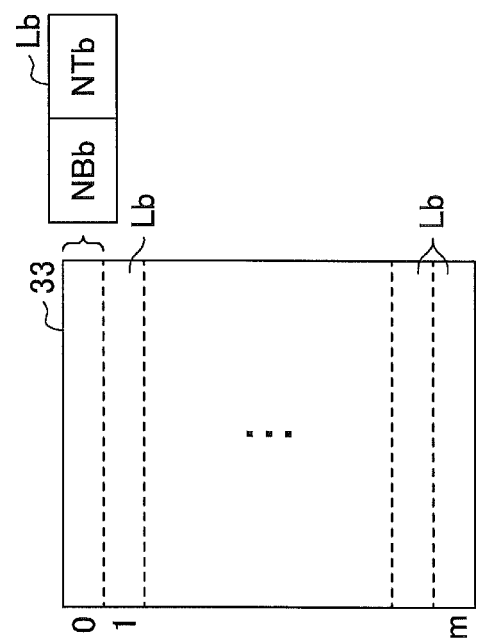
FIG.4A
FIG.4B

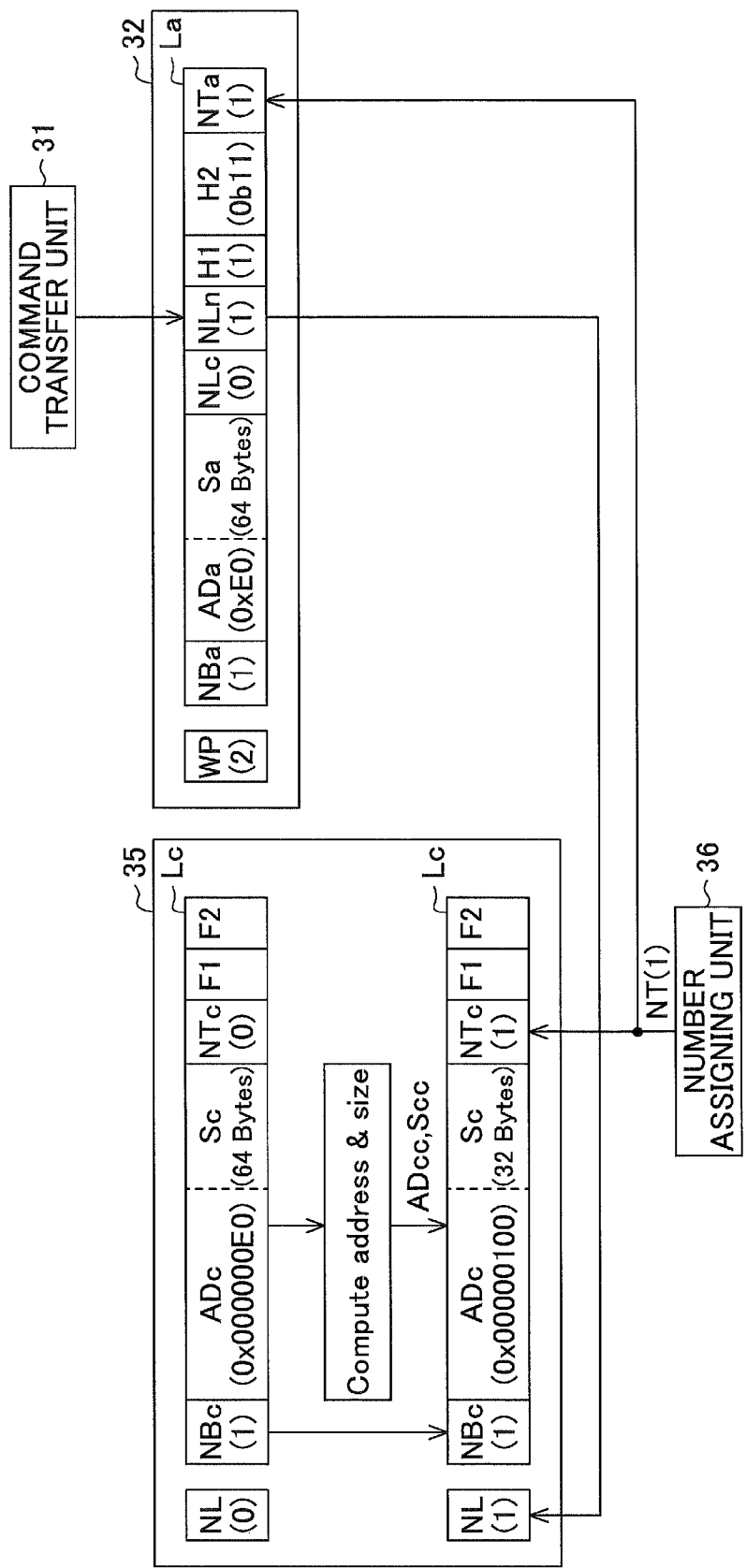

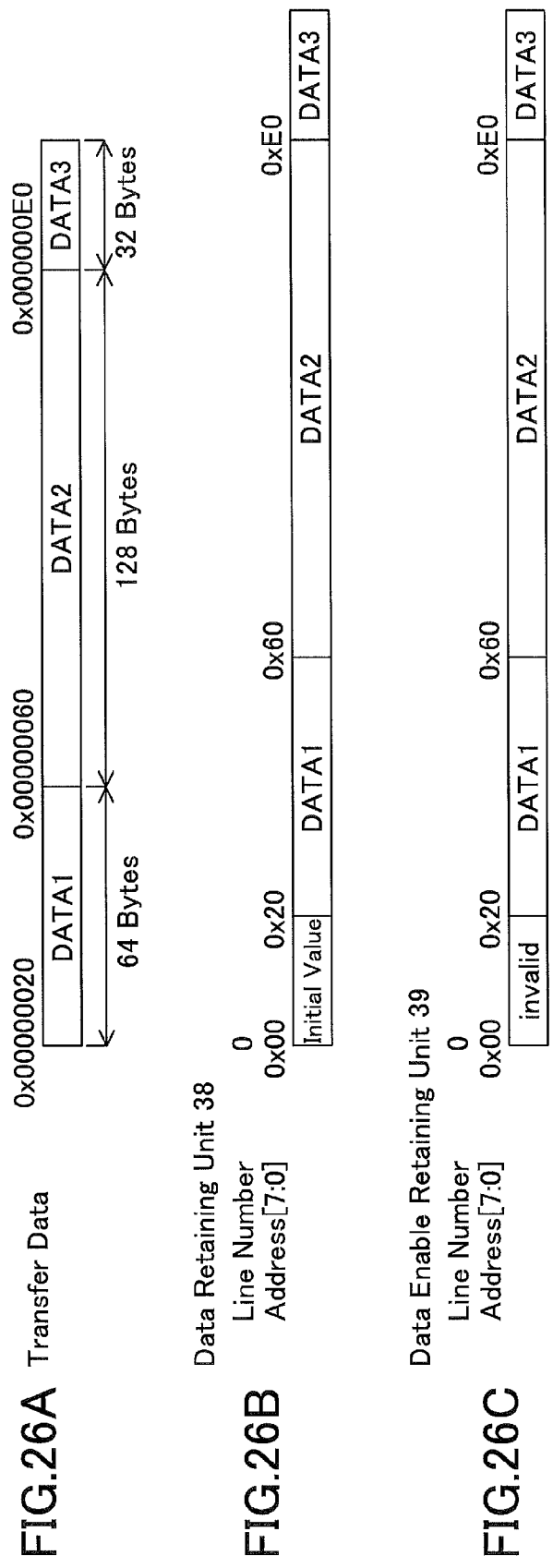

FIG.26D

Command Transfer

| | Output of Write Arbitration Unit 28A | | | | | | Command Queue 32 | | | | | | | | | | Retaining Unit 35 | | | | |
|---|---|---|---|---|---|---|---|---|---|---|---|---|---|---|---|---|---|---|---|---|---|
| NB | AD | Si | WP | NBa | ADa | Sa | NLc | NLn | H1 | H2 | NTa | NL | NBc | ADc | Sc | NTc | F1 | F2 |
| 1 | 0x00000020 | 64 | 0 | 1 | 0x20 | 64 | 0 | 0 | 0 | 0b00 | 0 | 0 | 1 | 0x00000020 | 64 | 0 | | |
| 1 | 0x00000060 | 128 | 1 | 1 | 0x60 | 128 | 0 | 0 | 1 | 0b00 | 0 | 0 | 1 | 0x00000060 | 128 | 0 | | |
| 1 | 0x000000E0 | 32 | 2 | 1 | 0xE0 | 32 | 0 | 0 | 1 | 0b10 | 0 | 0 | 1 | 0x000000E0 | 32 | 0 | | |

FIG.26E

Data Transfer

| | Command Queue 32 | | | | | | | | | | | Retaining Unit 35 | | | | | | Response Queue 33 | |
|---|---|---|---|---|---|---|---|---|---|---|---|---|---|---|---|---|---|---|---|
| RP | NBa | ADa | Sa | NLc | NLn | H1 | H2 | NTa | NL | NBc | ADc | Sc | NTc | F1 | F2 | NBb | NTb |
| 0 | 1 | 0x20 | 64 | 0 | 0 | 0 | 0b00 | 0 | 0 | 1 | 0x000000E0 | 32 | 0 | 0 | 0 | 1 | 0 |
| 1 | 1 | 0x60 | 128 | 0 | 0 | 1 | 0b00 | 0 | 0 | 1 | 0x000000E0 | 32 | 0 | 0 | 0 | 1 | 0 |
| 2 | 1 | 0xE0 | 32 | 0 | 0 | 1 | 0b10 | 0 | 0 | 1 | 0x000000E0 | 32 | 0 | 1 | 1 | 1 | 0 |

FIG.26F

Generate Coupling

| Command Queue 41 | | | | Response Queue 42 | |
|---|---|---|---|---|---|
| NBd | ADd | Sd | NTd | NBe | NTe |
| 1 | 0x00000000 | 256 | 0 | 1 | 0 |

FIG.27D

Command Transfer

| | Output of Write Arbitration Unit 28A | | | | Command Queue 32 | | | | | | | | | | Retaining Unit 35 | | | | |
|---|---|---|---|---|---|---|---|---|---|---|---|---|---|---|---|---|---|---|---|
| NB | AD | Si | WP | NBa | ADa | Sa | NLc | NLn | H1 | H2 | NTa | NL | NBc | ADc | Sc | NTc | F1 | F2 |
| 1 | 0x00000020 | 64 | 0 | 1 | 0x20 | 64 | 0 | 0 | 0 | 0b00 | 0 | 0 | 1 | 0x00000020 | 64 | 0 | | |

FIG.27E

Data Transfer

| | | Command Queue 32 | | | | | | | | | | Retaining Unit 35 | | | | | Response Queue 33 | |
|---|---|---|---|---|---|---|---|---|---|---|---|---|---|---|---|---|---|---|
| RP | NBa | ADa | Sa | NLc | NLn | H1 | H2 | NTa | NL | NBc | ADc | Sc | NTc | F1 | F2 | NBb | NTb |
| 0 | 1 | 0x20 | 64 | 0 | 0 | 0 | 0b00 | 0 | 0 | 1 | 0x00000020 | 64 | 0 | 0 | 1 | 1 | 0 |

FIG.27F

Generate Coupling

| Command Queue 41 | | | | Response Queue 42 | |
|---|---|---|---|---|---|
| NBd | ADd | Sd | NTd | NBe | NTe |
| 1 | 0x00000000 | 96 | 0 | 1 | 0 | ial
DATA TRANSFER APPARATUS AND DATA TRANSFER METHOD

CROSS-REFERENCE TO RELATED APPLICATIONS

This application is based upon and claims the benefit of priority of the prior Japanese Patent Application No. 2014-138712, filed on Jul. 4, 2014, the entire contents of which are incorporated herein by reference.

FIELD

The embodiments discussed herein are related to a data transfer apparatus and a data transfer method.

BACKGROUND

Conventionally, electronic apparatuses that handle data include a memory for storing the data. For example, a digital camera, which is an example of an apparatus that treats image data, stores the image data obtained from an imaging device into the memory. In addition, the digital camera carries out an image processing, such as a decoding process or the like, with respect to the image data read from the memory. The digital camera also displays, on a display unit, the image data stored in the memory.

Related art may include Japanese Laid-Open Patent Publications No. 2004-171209 and No. 11-242648, for example.

Various kinds of processing circuits included in the electronic apparatus described above make access to the memory, that is, write data to and read data from the memory. In a case in which a processing circuit having a short burst length is included in the electronic apparatus, a memory access made by this processing circuit may deteriorate a memory band utilization efficiency of an entire system in which a plurality of processing circuits operate.

SUMMARY

Accordingly, it is an object in one aspect of the embodiments to provide a data transfer apparatus and a data transfer method, which can improve a memory band utilization efficiency.

According to one aspect of the embodiments, a data transfer apparatus which transfers data input from a processing unit to a memory, including a command transfer unit including a command queue that retains a plurality of transfer requests input from the processing unit, a first judgment result indicating whether a plurality of data corresponding to the plurality of transfer requests input from the processing unit are continuous data, and a second judgment result indicating whether a size after coupling the plurality of data exceeds a first burst length less than or equal to a column size of the memory, and configured to output a write address based on the first judgment result and the second judgment result; a buffer unit including a plurality of line buffers, respectively having a size greater than or equal to the first burst length and configured to retain the data input from the processing unit in the plurality of line buffers according to the write address; a buffer management unit including a retaining unit that retains coupling information for coupling the transfer requests corresponding to the data retained in each of the plurality of line buffers; and a coupled command transfer unit configured to generate a transfer request after coupling, having a data size less than or equal to the first burst length and a start address based on the first burst length, by coupling the plurality of transfer requests based on the coupling information retained in the retaining unit, and to output the transfer request after the coupling.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A is a diagram for explaining a command queue;
FIG. 4B is a diagram for explaining a response queue;
FIG. 14 is a diagram for explaining the reception process for receiving the command transfer request.

FIGS. 26A, 26B, 26C, 26D, 26E, and 26F are diagrams for explaining an operation of a second example;

FIGS. 27A, 27B, 27C, 27D, 27E, and 27F are diagrams for explaining an operation of a third example;

DESCRIPTION OF EMBODIMENTS

Preferred embodiments of the present invention will be described with reference to the accompanying drawings.

A description will now be given of a data transfer apparatus and a data transfer method in each embodiment according to the present invention.

[First Embodiment]

A description will be given of a first embodiment, by referring to FIGS. 1 through 28D.

Figure 1:
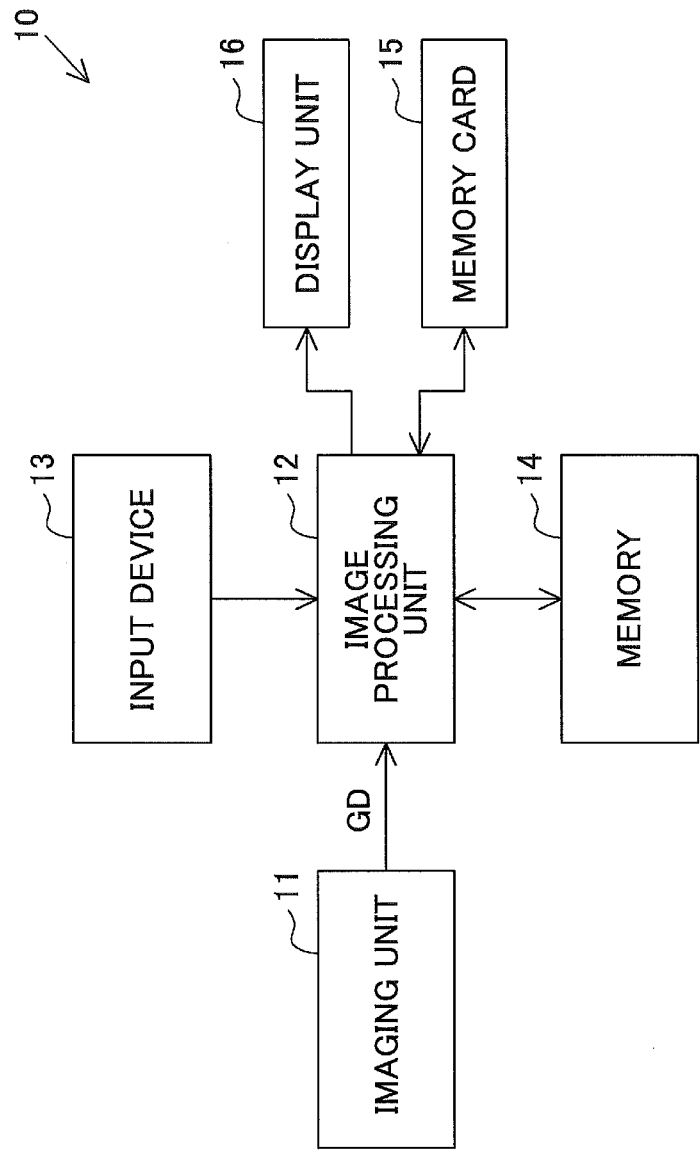
FIG. 1 is a block diagram illustrating an example of an imaging apparatus in one embodiment.

FIG. 1 is a block diagram illustrating an example of an imaging apparatus in one embodiment. An imaging apparatus 10 illustrated in FIG. 1 may be formed by a digital still camera, for example. The imaging apparatus 10 includes an imaging unit 11, an image processing unit 12, an input device 13, a memory 14, a memory card 15, and a display unit 16.

The imaging unit 11 includes an imaging optical system and an imaging device. The imaging optical system includes a lens (for example, a focusing lens) for converging light from an imaging target, a diaphragm for adjusting an amount of light passing through the lens, or the like. The imaging device may be formed by a CCD (Charge Coupled Device) image sensor, a CMOS (Complementary Metal Oxide Semiconductor) image sensor, or the like, for example. The imaging device converts incoming light into an electrical signal to generate image data of 1 frame. The imaging unit 11 digitizes analog image data output from the imaging device, and outputs digitized image data GD.

The image processing unit 12 receives the image data GD (for example, image data (Bayer data) in an RGB format) output from the imaging unit 11. The image processing unit 12 carries out various image processing with respect to the received image data. For example, the image processing unit 12 temporarily stores the image data in the memory 14 at a predetermined processing stage. The memory 14 may be formed by a rewritable memory, such as an SDRAM (Synchronous Dynamic Random Access Memory), or the like, for example. In addition, the image processing unit 12 stores the image data after being subjected to the various image processing and stored in the memory 14 to the memory card 15, and displays such image data on the display unit 16.

The input device 13 includes various switches, such as a shutter button, menu buttons, a touchscreen panel, or the like to be operated by a user. These various switches are used for capturing an image by taking a photograph, setting an imaging condition, setting a display format, or the like. The image processing unit 12 stores set values of information or the like required in an imaging mode or each process, according to an operation with respect to the input device 13.

The memory card 15 may be formed by a portable memory card, such as a compact flash (registered trademark), an SD (Secure Digital) memory card (registered trademark), or the like, for example.

The display unit 16 may be formed by an LCD (Liquid Crystal Display), an organic EL (Electro-Luminescence), or the like, for example. In addition, the display unit 16 may be formed by an EVF (Electronic View Finder), an interface for external connection, such as an HDMI (High-Definition Multimedia Interface, registered trademark), or the like, for example. The display unit 16 may be used to confirm the captured image, to display the captured image, to display the various information (for example, a remaining capacity of a battery used as a driving source) of the imaging apparatus 10, for example.

Figure 2:
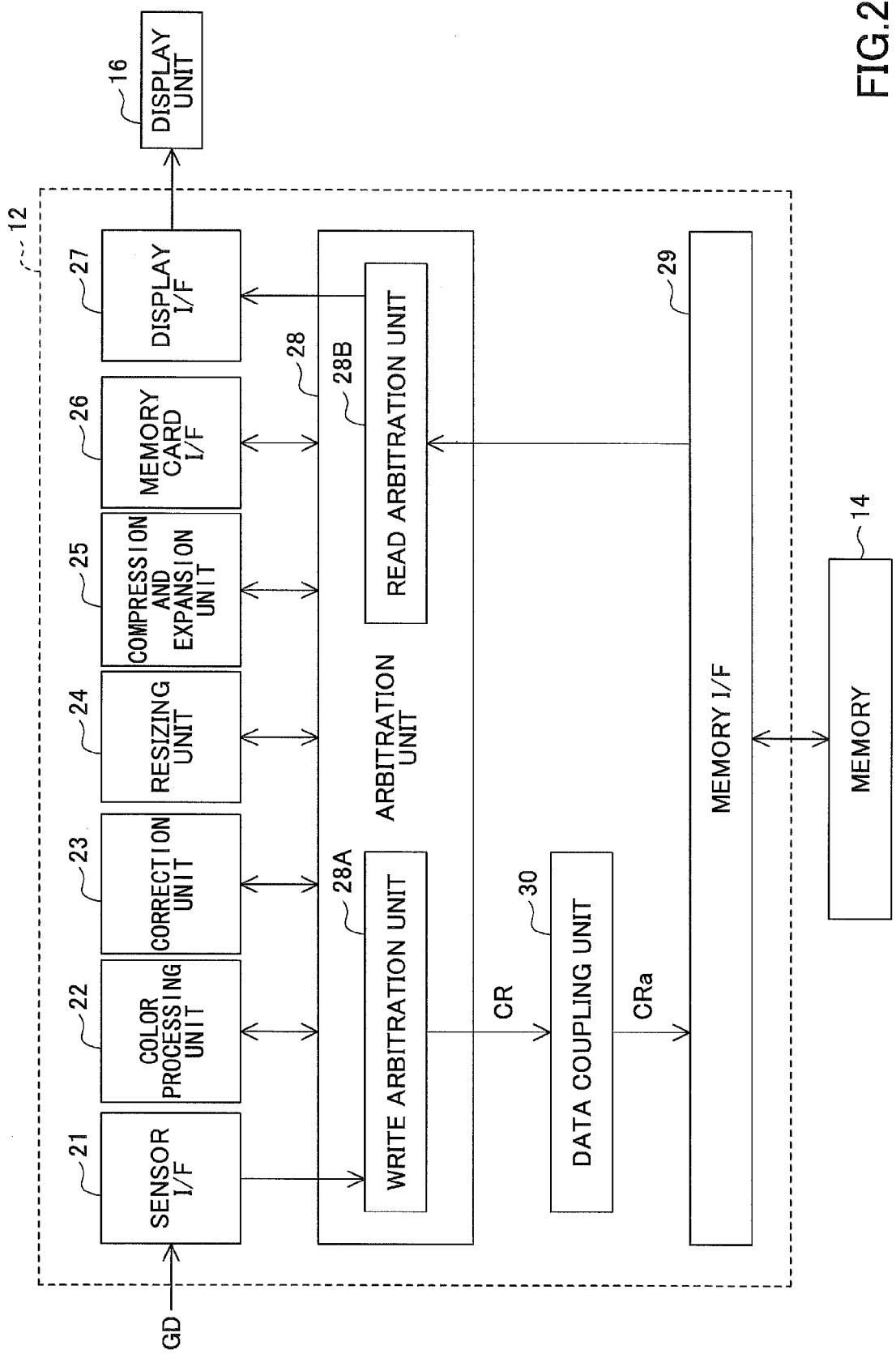
FIG. 2 is a block diagram illustrating an example of an internal configuration of an image processing unit in one embodiment.

Next, a description will be given of an example of an internal configuration of the image processing unit 12. FIG. 2 is a block diagram illustrating an example of the internal configuration of the image processing unit in one embodiment.

As illustrated in FIG. 2, the image processing unit 12 includes a sensor interface (I/F) 21, a color processing unit 22, a correction unit 23, a resizing unit 24, a compression and expansion unit 25, a memory card interface (I/F) 26, a display interface (I/F) 27, an arbitration unit 28, a memory interface (I/F) 29, and a data coupling unit 30.

The sensor I/F 21 receives the image data GD output from the imaging unit 11, and stores the image data in the memory 14. The color processing unit 22 carries out a color space conversion process with respect to the image data read from the memory 14, and stores the image data after the conversion process in the memory 14. The correction unit 23 carries out a correction process with respect to the image data read from the memory 14, and stores the image data after the correction in the memory 14. The correction process may include a gamma correction process for adjusting a brightness or a contrast, a distortion correction process for correcting an image distortion caused by the optical system, or the like, for example.

The resizing unit 24 changes the image size by carrying out a resizing process, such as a pixel data decimation, a data interpolation, or the like, with respect to the image data read from the memory 14. In addition, the resizing unit 24 stores the image data after the resizing process in the memory 14. The compression and expansion unit 25 generates compressed data according to a predetermined compression scheme, such as JPEG (Joint Photographic Experts Group), or the like, for example. The compression and expansion unit 25 also generates expanded data by expanding the compressed data. The compression and expansion unit 25 stores the generated compressed data in the memory 14, and stores the generated expanded data in the memory 14.

The memory card I/F 26 stores the data stored in the memory 14, such as the compressed image data, for example, in the memory card 15 illustrated in FIG. 1.

The display I/F 27 reads the image data stored in the memory 14, and outputs display data generated based on the read image data to the display unit 16.

The sensor I/F 21, the color processing unit 22, the correction unit 23, the resizing unit 24, the compression and expansion unit 25, the memory card I/F 26, and the display I/F 27 are examples of a processing unit. In the following description, in a case in which processes of the sensor I/F 21, the color processing unit 22, the correction unit 23, the resizing unit 24, the compression and expansion unit 25, the memory card I/F 26, and the display I/F 27 need not be distinguished from one another, these constituent elements will simply be referred to as processing units 21 through 27. The processing units 21 through 27 included in the image processing apparatus 12 and processing contents of each of the processing units 21 through 27 are merely examples, and the kind of processing units included in the image processing apparatus 12 and the processing contents of the processing units may be appropriately modified.

The processing units 21 through 27 output various signals including requests to access the memory 14 according to respective processing timings. The arbitration unit 28 arbitrates the request from the processing units 21 through 27, and permits access with respect to one processing unit according to an arbitration result thereof.

The arbitration unit 28 includes a write arbitration unit 28A and a read arbitration unit 28B. The write arbitration unit 28A arbitrates conflicting write requests output from the processing units 21 through 27 according to a priority that is set in correspondence with each of the processing units 21 through 27, for example, and permits the write access with respect to one processing unit. The one processing unit permitted the write access outputs a control signal to the write arbitration unit 28A for making the write access with respect to the memory 14. This control signal may include a command transfer request, a data transfer request, an address, data, a data enable, or the like, for example. The write arbitration unit 28A outputs the write request in accordance with an arbitration result, and the control signal from the one processing unit permitted the write access, to the memory I/F 29 via the data coupling unit 30.

On the other hand, the read arbitration unit 28B arbitrates conflicting read requests output from the processing units 21 through 27 according to a priority that is set in correspondence with each of the processing units 21 through 27, for example, and permits the read access with respect to one processing unit. The one processing unit permitted the read access outputs a control signal to the read arbitration unit 28B for making the read access with respect to the memory 14. This control signal may include various kinds of commands, an address, data, or the like, for example. The read arbitration unit 28B outputs the read request in accordance with an arbitration result, and the control signal from the one processing unit permitted the read access, to the memory I/F 29.

The data coupling unit 30 couples a plurality of command transfer requests CR based on the control signal (for example, a command transfer request CR) or the like from the write arbitration unit 28A and converts the plurality of command transfer requests CR into a transfer request having a long burst length. In addition, the data coupling unit 30 further converts the converted transfer request into a command transfer request CRa after the coupling and having a start address based on an arbitrary data size. This arbitrary data size corresponds to an arbitrary burst length (or first burst length), for example. More particularly, the data coupling unit 30 converts the converted transfer request into the command transfer request CRa after the coupling and having the start address with an alignment unit of an arbitrary burst length (for example, 256 bytes). The alignment unit of the arbitrary data size indicates an address range that is segmented for every arbitrary data size. For example, in a case in which the arbitrary data size is 256 bytes, the alignment unit of the arbitrary data size refers to a range in which lower 7th bit to 0th bit become "0" (ADx[7:0]=0b00000000), and the start address advances in a manner 0x00000000->0x00000100->0x00000200. The data coupling unit 30 couples transfer data corresponding to the plurality of command transfer requests CR that are coupled, and retains the coupled transfer data. In addition, the data coupling unit 30 outputs to the memory I/F 29 the command transfer request CRa after the coupling, the transfer data after the coupling, and the data enable. In this case, the arbitrary burst length described above is set to a size within a range of a column address of the memory 14. For example, the arbitrary burst length is set to a size corresponding to a divisor of the column size of the memory 14. In a case in which the column size of the memory 14 is 512 bytes, for example, the arbitrary burst length may be set to 128 bytes, or to 256 bytes as in this example. A data size (or burst size) transferred in 1 burst cycle is determined by a bus width. In other words, in a case in which the bus width is 64 bits (or 8 bytes), the data size transferred in 1 burst cycle is 8 bytes. In this case, when the arbitrary burst length described above is 256 bytes, the data having this arbitrary burst length is transferred in 32 burst cycles.

Figure 3:
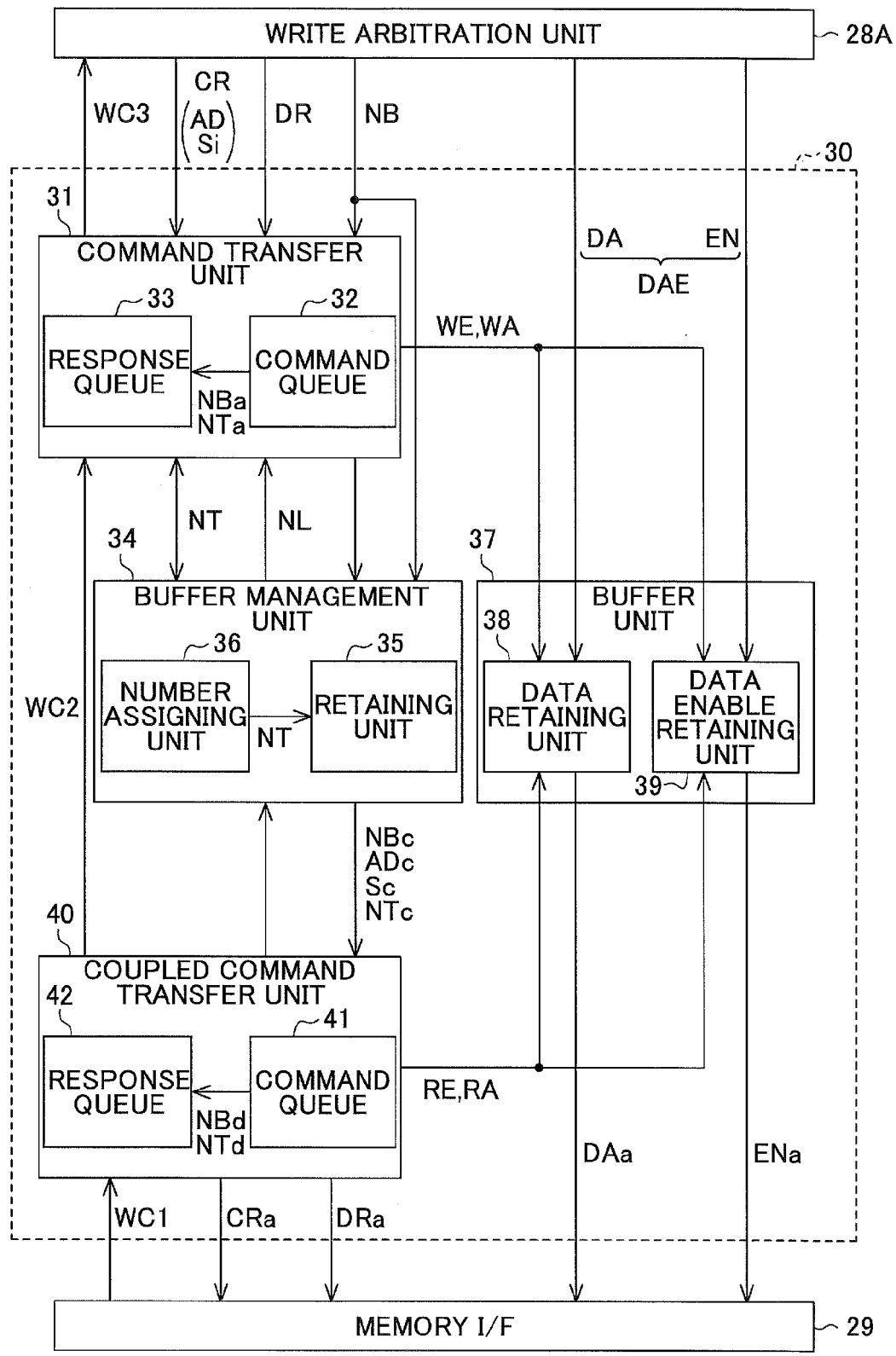
FIG. 3 is a block diagram illustrating an example of an internal configuration of a data coupling unit in one embodiment.

The memory I/F 29 outputs the command transfer request CRa and a data transfer request DRa illustrated in FIG. 3 from the data coupling unit 30, and the data coupled in the data coupling unit 30, to the memory 14 to store the data in the memory 14. In addition, in the case of the read request, the memory I/F 29 reads the data from the memory 14 according to the control signal from the processing unit, and outputs the read data to the processing unit at a transfer request source.

In the following description, each of the processing units 21 through 26 may be referred to as a bus master with respect to the write arbitration unit 28A.

Next, a description will be given of an internal configuration of the data coupling unit 30. FIG. 3 is a block diagram illustrating an example of the internal configuration of the data coupling unit in one embodiment.

As illustrated in FIG. 3, the data coupling unit 30 includes a command transfer unit 31, a buffer management unit 34, a buffer unit 37, and a coupled command transfer unit 40.

The command transfer unit 31 includes a command queue 32 for successively accumulating the command transfer request CR (hereinafter also simply referred to as "transfer request CR") selected by the write arbitration unit 28A, and a response queue 33 for successively accumulating a response request with respect to the bus master. The command transfer unit 31 generates a write control signal WE for controlling writing of data DA and a data enable EN with respect to the buffer unit 37, based on the command transfer request CR and the data transfer request DR input from the write arbitration unit 28A. The command transfer request CR includes an address AD and a size Si of the transfer data corresponding to the command transfer request CR. When the command transfer unit 31 receives the command transfer request CR and the data transfer request DR, the command transfer unit 31 outputs a response command corresponding to each of these transfer requests to the write arbitration unit 28A.

The buffer unit 37 includes a data retaining unit 38 for retaining the data DA supplied from the write arbitration unit 28A, and a data enable retaining unit 39 for retaining the data enable EN supplied from the write arbitration unit 28A.

Figure 7A:
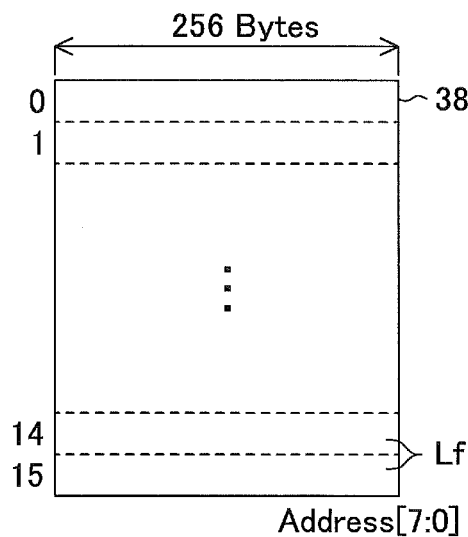
FIG. 7A is a diagram for explaining a data retaining unit.

FIG. 7A is a diagram for explaining the data retaining unit. As illustrated in FIG. 7A, the data retaining unit 38 includes a plurality of (16 in this example) line buffers Lf capable of retaining the data DA having the arbitrary burst length described above (256 bytes of the data DA in this example). In other words, the data retaining unit 38 includes the plurality of line buffers Lf respectively having a size amounting to the arbitrary burst length of greater.

Figure 7B:
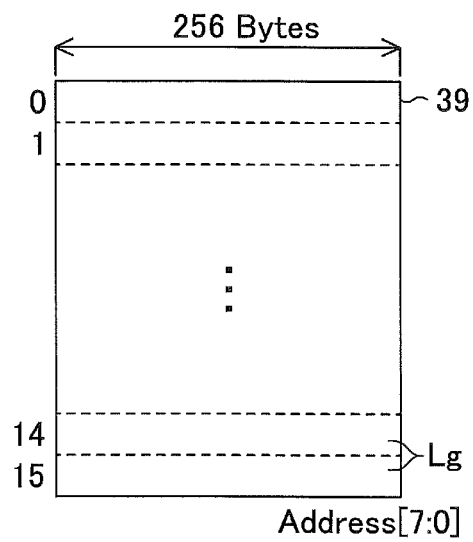
FIG. 7B is a diagram for explaining a data enable retaining unit.

FIG. 7B is a diagram for explaining the data enable retaining unit. As illustrated in FIG. 7B, the data enable retaining unit 39 includes a plurality of (16 in this example) line buffers Lg capable of retaining the data enable EN having the arbitrary burst length described above (256 bytes of the data enable EN in this example). In other words, the data enable retaining unit 39 includes the plurality of line buffers Lg respectively having a size amounting to the arbitrary burst length of greater. In the following description, the data retaining unit 38 and the data enable retaining unit 39 may be referred to by a generic name "buffer unit 37", the line buffer Lf and the line buffer Lg may be referred to by a generic name "line buffer Lfg", and the data DA and the data enable EN may be referred to by a generic name "transfer data DAE".

The command transfer unit 31 receives transfer information, such as a bus master number NB of a transfer request source, for example, from the write arbitration unit 28A. The command transfer unit 31 judges whether the received command transfer request CR is from the same bus master that is the transfer request source of the command transfer request CR retained in the buffer management unit 34, based on the bus master number NB. In addition, the command transfer unit 31 judges whether the address AD of the received command transfer request CR and the address of the command transfer request CR retained in the buffer management unit 34 are consecutive, that is, whether the data corresponding to the two command transfer requests CR are continuous data and can be coupled. Furthermore, the command transfer unit 31 judges whether a data size after the coupling exceeds a size amounting to 1 line of the line buffer Lfg of the buffer unit 37, that is, whether the command transfer request CR after the coupling exceeds the arbitrary burst length described above. The command transfer unit 31 retains in the command queue 32 the judgment results or the like together with the command transfer requests CR.

FIG. 4A is a diagram for explaining the command queue. As illustrated in FIG. 4A, the command queue 32 includes a plurality of (n+1 in this example) lines La. Each line La retains a bus master number NBa of the transfer request source of the command transfer request CR, and an address ADa and a size Sa corresponding to the command transfer request CR. For example, this address ADa corresponds to an address range amounting to 1 line of the line buffer Lfg of the buffer unit 37, amongst the address AD of the command transfer request CR. In a case in which each line buffer Lfg has 256 bytes, for example, an address AD[7:0] of the lower 8 bits of the address AD of the command transfer request CR becomes the address ADa. The size Sa is a size Si supplied from the write arbitration unit 28A, and may be obtained by multiplying a number of burst cycles to a bus width (for example, 8 bytes). In addition, each line La retains a line number NLc of the buffer unit 38 to which a transfer data DAE corresponding to the command transfer request CR is to be written, and a line number NLn of the buffer unit 37 to which the transfer data DAE is to be written next in a case in which the command transfer request CR exceeds the size amounting to 1 line of the buffer unit 37. The command queue 32 retains a judgment result H1 indicating whether the address AD of the command transfer request CR is from the same bus master that is the transfer request source of the command transfer request CR previously retained in the buffer management unit 34 and the addresses of the two command transfer requests are consecutive. The command queue 32 retains a judgment result H2 indicating whether the data size after the coupling exceeds the size amounting to 1 line of the line buffer Lfg of the buffer unit 37. The command queue 32 retains a transaction number NT output from the buffer management unit 34 as a transaction number NTa. The transaction number NT indicates (or identifies) the command transfer request after the coupling. In addition, the transaction number NT is assigned by the buffer management unit 34, and is a cyclic number from 0 to N, where N denotes the number of lines of the buffer unit 37, for example.

In addition, the command queue 32 stores the address ADa or the like in the line La (line La at a line number "1" in the illustrated example) indicated by a write pointer WP, and updates the write pointer WP. The command queue 32 reads the address ADa or the line from the line La (line La at a line number "0" in the illustrated example) indicated by a read pointer RP, and updates the read pointer RP. Updating the write pointer WP refers to changing the value to indicate a next data write position, and updating the read pointer RP refers to changing the value to indicate a next data read position.

As illustrated in FIG. 3, the command transfer unit 31 outputs to the buffer unit 37 a write address WA in accordance with the address ADa and a line number NLc retained in the command queue 32, based on the data transfer request DR corresponding to the command transfer request CR that is received as described above. The data DA and the data enable EN output from the write arbitration unit 28A are written at the address of the buffer unit 37 indicated by the write address WA.

The command transfer unit 31 judges whether a data coupling amounting to 1 line of the buffer unit 37 is completed. The command transfer unit 31 also judges whether a command transfer request CR that may be coupled after a processing target data exists within the command queue 32. In addition, the command transfer unit 31 stores the judgment result corresponding to data transfer request DR in a retaining unit 35 within the buffer management unit 34. Further, the command transfer unit 31 moves the bus master number NBa and the transaction number NTa retained in the command queue 32 to the response queue 33.

FIG. 4B is a diagram for explaining the response queue. As illustrated in FIG. 4B, the command queue 33 includes a plurality of (m+1 in this example) lines Lb. Each line Lb retains the bus master number NBa from the command queue 32 as a bus master number NBb of the transfer request, and retains the transaction number NTa from the command queue 32 as a transaction number NTb.

The buffer management unit 34 includes the retaining unit 35 that retains buffer information (or coupling information) for generating the command transfer request CRa after the coupling, and a number assigning unit 36 that manages the transaction number NT. The number assigning unit 36 manages the above described transaction number NT corresponding to the command transfer request CR amounting to 1 line of the buffer unit 37. For example, the number assigning unit 36 generates a new transaction number NT with respect to the command queue 32 on one hand, and releases the transaction number NT corresponding to the command transfer request CR after completion of the transfer on the other. The number assigning unit 36 outputs the generated transaction number NT to the retaining unit 35 and the command queue 32.

Figure 5:
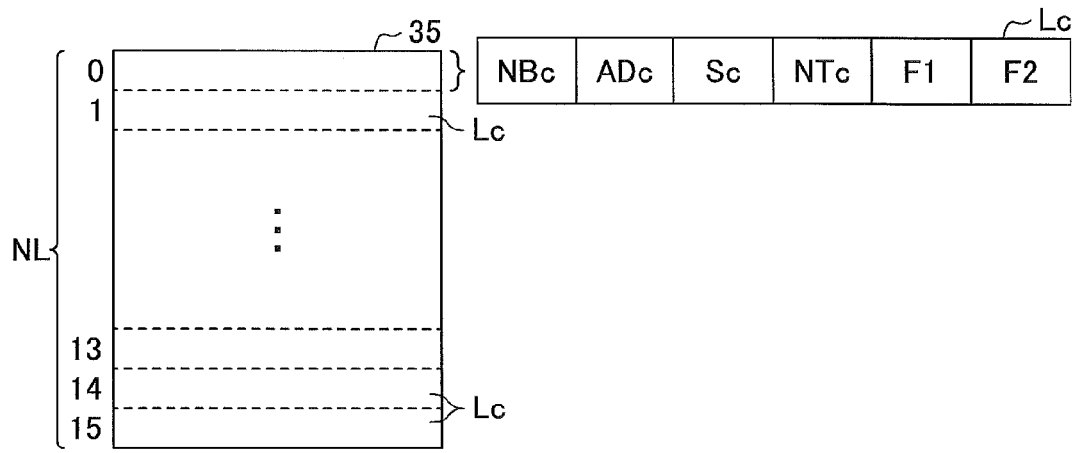
FIG. 5 is a diagram for explaining a retaining unit.

FIG. 5 is a diagram for explaining the retaining unit. As illustrated in FIG. 5, the retaining unit 35 can retain the buffer information amounting to the lines of the buffer unit 37. More particularly, the retaining unit 35 includes a number of line buffers Lc amounting to the number of lines (16 in this example) of the buffer unit 37, where each line buffer Lc is capable of storing the buffer information corresponding to 1 line of the buffer unit 37. For example, the buffer information corresponding to the data retained at the line number "1" of the buffer unit 37 is stored in the line buffer Lc at the line number NL that is "1". Each line buffer Lc stores the information of the last command transfer request CR amongst the plurality of command transfer requests CR that are coupled.

To describe the retaining unit 35 in more detail, the retaining unit 35 retains the bus master number NB from the write arbitration unit 28A as a bus master number NBc of a coupling target. The retaining unit 35 retains an address ADc and a size Sc of the command transfer request CR for writing the data to the same line buffer Lfg of the buffer unit 37 of the same bus master, that is, the last command transfer request CR amongst the command transfer requests CR accumulated in the command queue 32. The retaining unit 35 retains a flag F1 indicating a completion of a data coupling process amounting to 1 line (for example, 256 bytes) of the buffer unit 37 by the data transfer by the command transfer unit 31 to the buffer unit 37. The retaining unit 35 stores a flag F2 indicating an interruption of the data coupling process at a data size amounting to less than 1 line of the buffer unit 37. In other words, the retaining unit 35 retains the flags F1 and F2 as the judgment result corresponding to the data transfer request DR output from the command transfer unit 31. Further, the retaining unit 35 retains the transaction number NT from the number assigning unit 36 as a transaction number NTc.

As illustrated in FIG. 3, the coupled command transfer unit 40 includes a command queue 41 for successively accumulating the command transfer request CRa after the coupling, and a response queue 42 for successively accumulating the response request with respect to the bus master.

The coupled command transfer unit 40 generates the command transfer request CRa after the coupling, based on the buffer information retained in the retaining unit 35, and stores the command transfer request CRa after the coupling to the command queue 41.

Figure 6A:
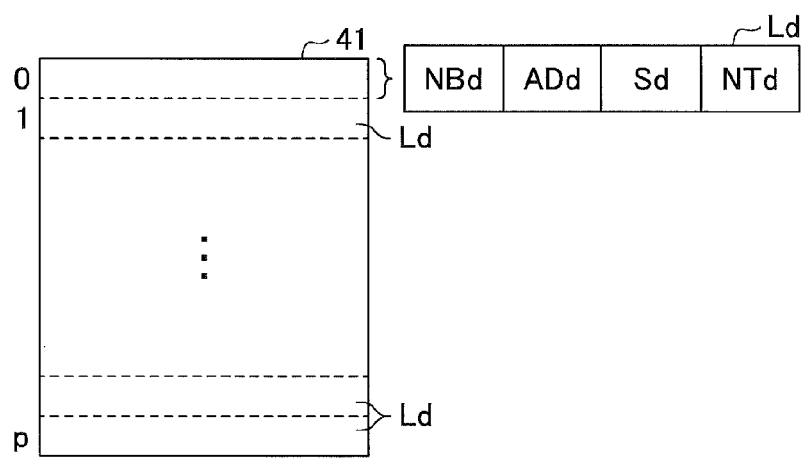
FIG. 6A is a diagram for explaining the command queue.

FIG. 6A is a diagram for explaining the command queue. As illustrated in FIG. 6A, the command queue 41 includes a plurality of (p+1 in this example) lines Ld. Each line Ld retains the bus master number NBc output from the retaining unit 35 as a bus master number NBd of the transfer request source after the coupling. Each line Ld also retains an address ADd after the coupling and a size Sd after the coupling, which are computed based on the address ADc and the size Sc output from the retaining unit 35. In addition, each line Ld retains the transaction number NTc output from the retaining unit 35, as a transaction number NTd.

The coupled command transfer unit 40 illustrated in FIG. 3 issues the command transfer request CRa after the coupling and the data transfer request DRa after the coupling to the memory I/F 29, and outputs to the buffer unit 37 a read control signal RE and a read address RA for reading the transfer data DAE from each line buffer Lfg of the buffer unit 37. The buffer unit 37 outputs to the memory I/F 29 the data DA and the data enable EN stored at the address of the buffer unit 37 specified by the read address RA, based on the read control signal RE. The coupled command transfer unit 40 moves the transfer request information (for example, the bus master number NBd of the transfer request source) corresponding to the data transferred to the memory I/F 29 and the transaction number NTd from the command queue 41 to the response queue 42.

Figure 6B:
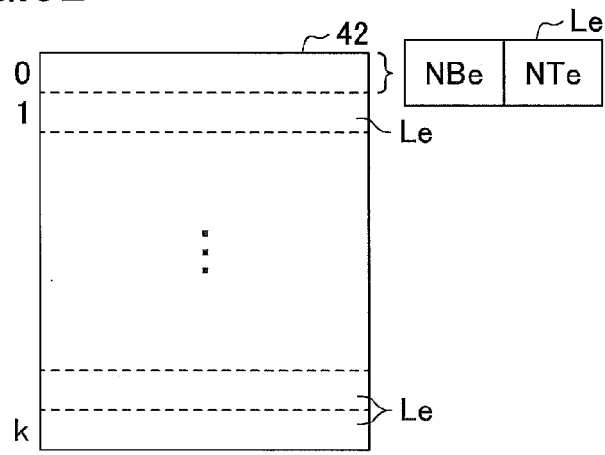
FIG. 6B is a diagram for explaining the response queue.

FIG. 6B is a diagram for explaining the response queue. As illustrated in FIG. 6B, the response queue 42 includes a plurality of (k+1 in this example) lines Le. Each line Le retains the bus master number NBd from the command queue 41, as a bus master number NBe of the transfer request source, and the transaction number NTd from the command queue 41, as a transaction number NTe.

In the case of the coupled command transfer unit 40 illustrated in FIG. 3, when a write complete notification WC1 indicating the completion of the data write with respect to the memory 14 is input from the memory I/F 29, the coupled command transfer unit 40 outputs a write complete notification WC2 from the response queue 42 to the response queue 33. More particularly, the response queue 42 outputs the write complete notification WC2 with respect to the response request having the transaction number NTb that is the same as the transaction number NTe retained in the response queue 42, amongst the response requests retained in the response queue 33. The response queue 33 outputs a write complete notification WC3 corresponding to all response requests having the same transaction number NTb to the write arbitration unit 28A, and outputs the transaction number NTb to the buffer management unit 34, based on the write complete notification WC2. The buffer management unit 34 releases the transaction number NT input from the response queue 33, and reuses this transaction number NT in a subsequent process. When the coupled command transfer unit 40 receives the write complete notification WC1 from the memory I/F 29, the coupled command transfer unit 40 outputs a response command with respect to this write complete notification WC1 to the memory I/F 29. In addition, when the memory I/F 29 receives the command transfer request CRa and the data transfer request DRa from the coupled command transfer unit 40, the memory I/F 29 outputs to the coupled command transfer unit 40 response commands respectively corresponding to the command transfer request CRa and the data transfer request DRa.

In this embodiment, the write arbitration unit 28A and the data coupling unit 30 are examples of a data transfer unit. The command queue 32 is an example of a first command queue, the response queue 33 is an example of a first response queue, the command queue 41 is an example of a second command queue, and the response queue 42 is an example of a second response queue. The line buffers Lf and Lg are examples of a first line buffer, the line buffer Lc is an example of a second line buffer, the judgment result H1 is an example of a first judgment result, and the judgment result H2 is an example of a second judgment result. The flag F1 is an example of a first flag, and the flag F2 is an example of a second flab. In addition, the transaction numbers NT and NTa through NTe are examples of a first number, and the bus master numbers NB and NBa through NBe are examples of a second number.

Next, a description will be given of an operation of the data coupling unit 30, by referring to FIGS. 8 through 27F. The operation of the data coupling unit 30 will be described by referring to a plurality of examples. In the following description, the operation of the data coupling unit 30 will be described under the following conditions (1) through (6).

(1) A bus protocol employs specifications (for example, AXI specifications) in which the command and the data are separated.

(2) The bus width is 64 bits (or 8 bytes).

(3) The arbitrary bus length (that is, the size of each line buffer Lfg of the buffer unit 37) is 256 bytes.

(4) The number of lines of the retaining unit 35 and the buffer unit 37 is 16.

Figure 8:
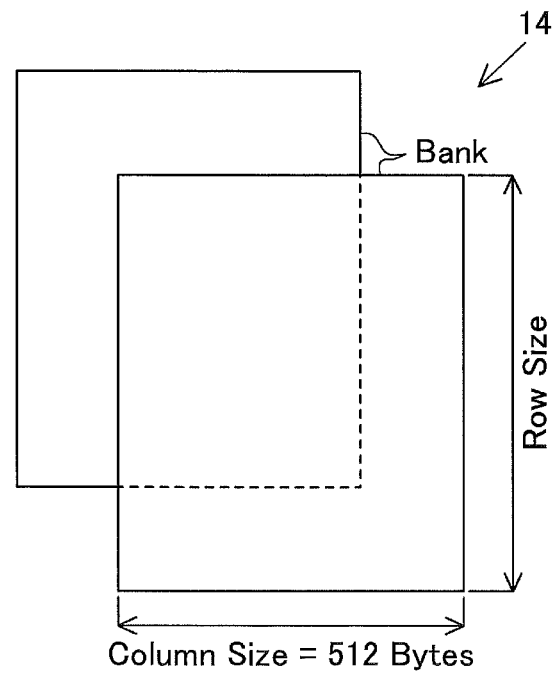
FIG. 8 is a diagram for explaining a memory.

(5) The memory 14 (SDRAM) has a plurality of banks, and the column size is 512 bytes, as illustrated in FIG. 8. FIG. 8 is a diagram for explaining the memory.

(6) The address AD output from the bus master (or write arbitration unit 28A) to the data coupling unit 30 is a 32-bit signal.

Figure 9A:
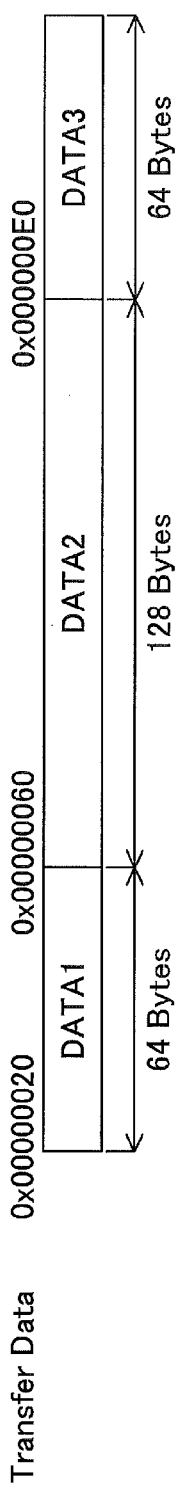
FIGS. 9A, 9B, and 9C are diagrams for explaining an operation in a first example.
Figure 9B:
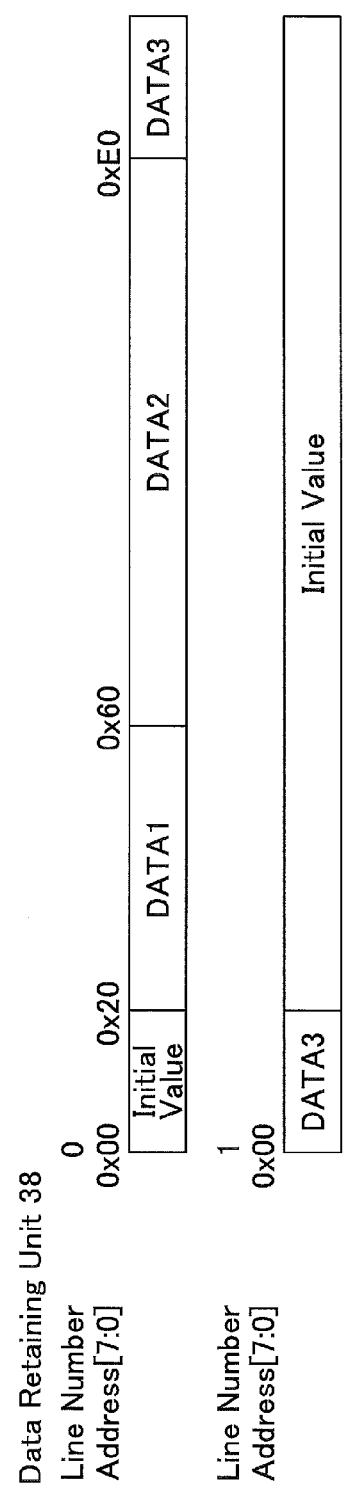
Figure 9C:
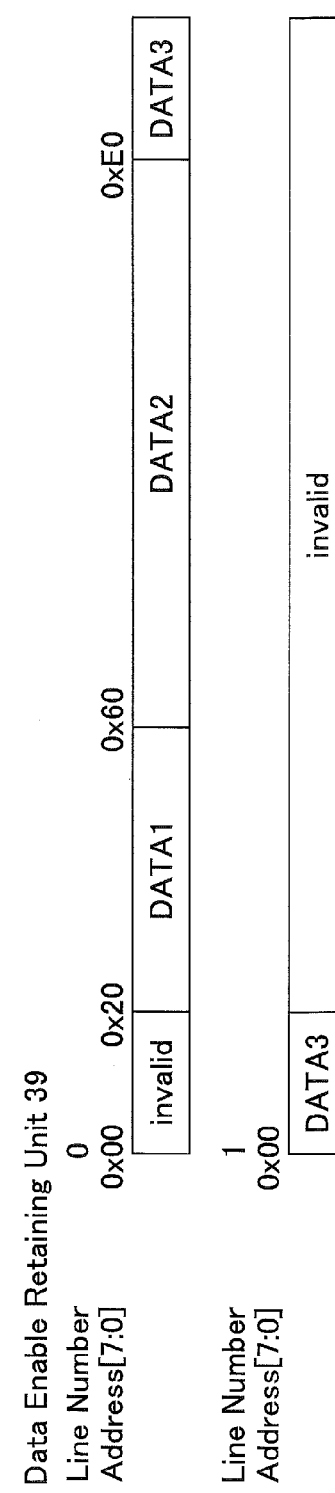

First, a description will be given of the operation of the data coupling unit 30 when receiving the command transfer request CR from the write arbitration unit 28A, by referring to a first example illustrated in FIGS. 9A through 9C. FIGS. 9A, 9B, and 9C are diagrams for explaining the operation in the first example.

First, as illustrated in FIG. 9A, the data coupling unit 30 receives a data DATA1 having a start address "0x00000020" and a size of 64 bytes, from a predetermined bus master via the write arbitration unit 28A. Next, the data coupling unit 30 receives, from the same bus master, a data DATA2 having a start address "0x00000060" and a size of 128 bytes. Then, the data coupling unit 30 receives, from the same bus master, a data DATA3 having a start address "0x000000E0" and a size of 64 bytes. After receiving the data DATA1 through DATA3, the transfer request from the same bus master ends. As is well known, "0x" in the start address such as "0x00000020" or the like indicates that the value indicated thereby is a hexadecimal value.

First, prior to starting the transfer process, the buffer unit 37 is initialized to an arbitrary value (for example, "0"). In this example, the data enable retaining unit 39 needs to be initialized to "0", however, the data retaining unit 38 may be initialized to an undefined value. In addition, prior to starting the transfer process, the command queues 32 and 41, the response queues 33 and 42, the retaining unit 35, the transaction number NT, and various pointers including the write pointer WP and the read point RP are initialized.

Figure 10:
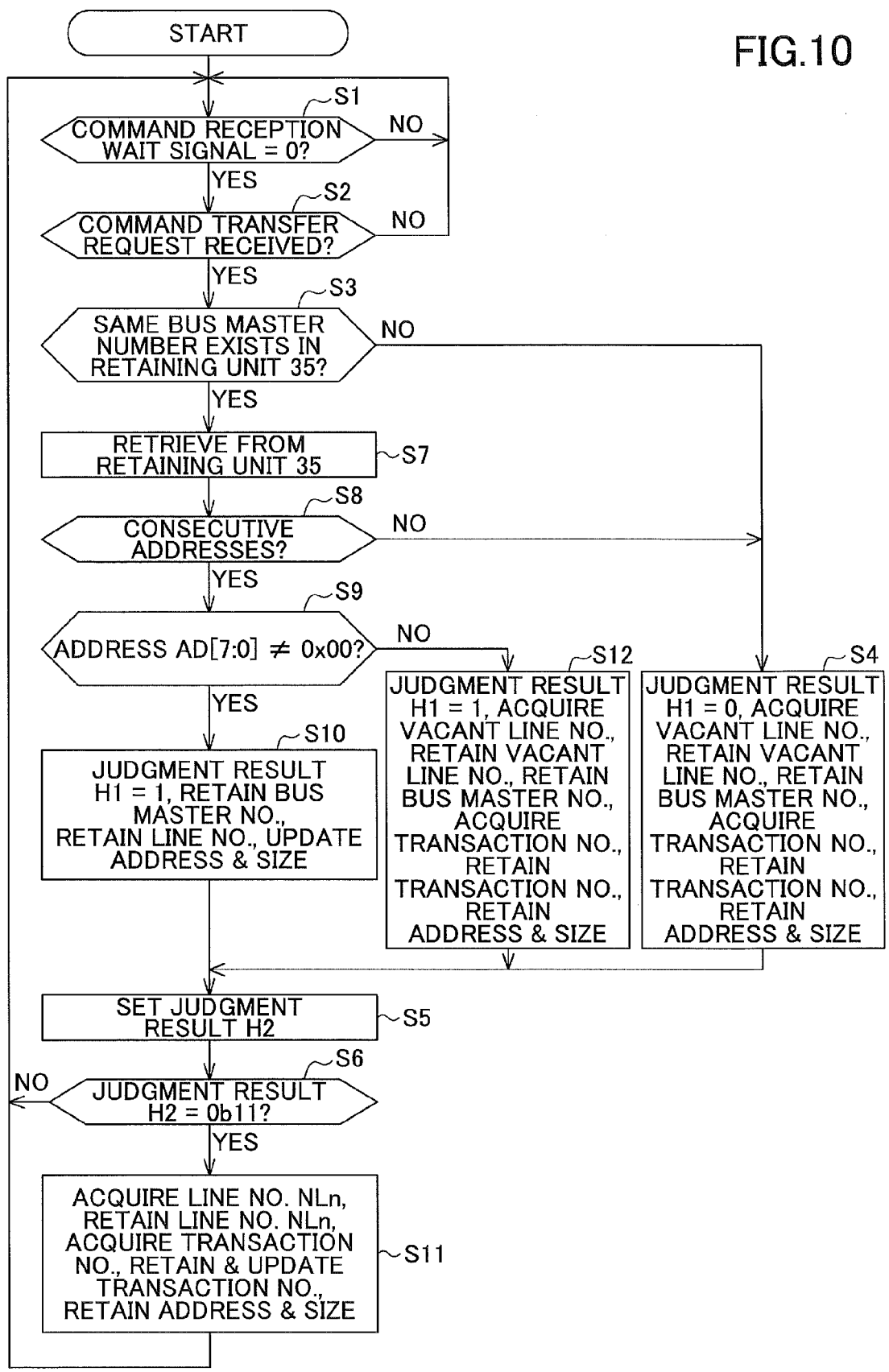
FIG. 10 is a flow chart for explaining a reception process for receiving a command transfer request.
Figure 11:
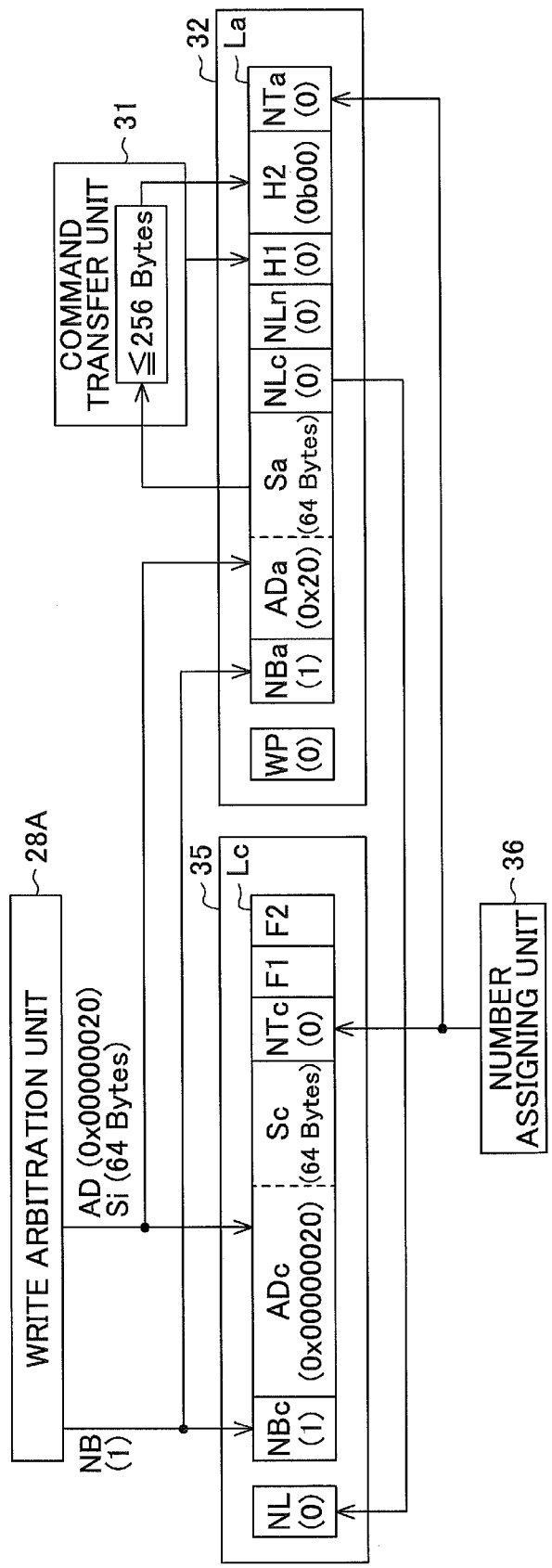
FIG. 11 is a diagram for explaining the reception process for receiving the command transfer request.

Next, a description will be given of the operation of the data coupling unit 30 when receiving the command transfer request CR corresponding to the data DATA1 described above, by referring to FIGS. 10 and 11. FIG. 10 is a flow chart for explaining a reception process for receiving the command transfer request, and FIG. 11 is a diagram for explaining the reception process for receiving the command transfer request.

In step S1 illustrated in FIG. 10, the command transfer unit 31 judges whether a command reception wait signal to be described later is "0". The process advances to step S2 when the command reception wait signal is "0" and the judgment result in step S1 is YES. On the other hand, when the command reception wait signal is "1" and the judgment result in step S1 is NO, step S1 is repeated until the judgment result in step S1 becomes YES.

In step S2, the command transfer unit 31 judges whether the command transfer request CR is received from the write arbitration unit 28A, and steps S1 and S2 are repeated until the command transfer request CR is received. Thereafter, the process advances to step S3 when the command transfer request CR with respect to the data DATA1 is received and the judgment result in step S2 becomes YES.

In step S3, the command transfer unit 31 judges whether the command transfer request CR from the same bus master as the received command transfer request Cr is stored in the retaining unit 35, when storing the command transfer request CR from the bus master selected by the write arbitration unit 29A in the command queue 32. More particularly, based on the bus master number NB ("1" in this example) output from the write arbitration unit 28A, a judgment is made to determine whether a bus master number identical to this bus master number NB is stored within the retaining unit 35. In this case, because the bus master number identical to the bus master number NB which is "1" is not stored in the retaining unit 35, the judgment result in step S3 is NO and the process advances to step S4.

In step S4, because the command transfer request CR from the same bus master does not exist within the retaining unit 35, the command transfer unit 31 retains "0" which indicates that the addresses are not consecutive in the judgment result HA of the command queue 32 indicated by the write pointer WP ("0" in this example), as illustrated in FIG. 11. In addition, the command transfer unit 31 acquires a vacant line number (line number "0" in this example) of the buffer unit 37, not storing the data DA and the data enable EN, and retains the vacant line number "0" in a line number NLc of the command queue 32 indicated by the write pointer WP. Moreover, the command transfer unit 31 retains the bus master number NB ("1" in this example) of the transfer request source output from the write arbitration unit 28A in the bus master number NBa of the command queue 32 indicated by the write pointer WP. Furthermore, the command transfer unit 31 retains the address AD[7:0] ("0x20" in this example) of the lower 8 bits of the address AD output from the write arbitration unit 28A in the address ADa of the command queue 32 indicated by the write pointer WP. The command transfer unit 31 also retains the size Si (64 bytes in this example) output from the write arbitration unit 28A in the size Sa of the command queue 32 indicated by the write pointer WP. In step S4, the number assigning unit 36 registers to itself the transaction number NT which is "0", and retains this transaction number NT in the transaction number NTa of the command queue 32 indicated by the write pointer WP. In addition, the number assigning unit 36 retains the transaction number NT which is "0" in the transaction number NTc of the retaining unit 35 (line buffer Lc) at the line number NL that is the same as the vacant line number "0" retained in the line number NLc of the command queue 32. In step S4, the buffer management unit 34 retains the bus master number NB ("1" in this example) of the transfer request source, the address AD ("0x00000020" in this example) of the command transfer request CR, and the size Si (64 bytes in this example) in the line buffer Lc at the line number NL which is "0".

By carrying out the process of the step S4 described above, the command transfer unit 31, in step S5 which follows, sets the judgment result H2 of the command queue 32, according to a judgment result of an added value which is obtained by adding the size Sa to the address ADa retained in the command queue 32, and the arbitrary burst length (256 bytes in this example). For example, the command transfer unit 31 sets the judgment result H2 to "0b00" in a case in which the added value is smaller than 256 bytes. In this case, the size of the transfer data corresponding to the command transfer request CR retained in the command queue 32 is smaller than the data size of 1 line of the buffer unit 37, and a vacancy exists in the buffer unit 37. In a case in which the added value is equal to 256 bytes, the command transfer unit 31 sets the judgment result H2 to "0b10". In this case, the size of the transfer data corresponding to the command transfer request CR retained in the command queue 32 is equal to the data size of 1 line of the buffer unit 37, and no vacancy exists in the buffer unit 37. Further, in a case in which the added value is larger than 256 bytes, the command transfer unit 31 sets the judgment result H2 to "0b11". In this case, the size of the transfer data corresponding to the command transfer request CR retained in the command queue 32 is larger than the data size of 1 line of the buffer unit 37, and a new line number of the buffer unit 37 becomes required. In this example, when the size Sa (=64 bytes) is added to the address ADa (=0x20) retained in the command queue 32 indicated by the write pointer WP ("0" in this example), the added value becomes 96 bytes. For this reason, the command transfer unit 31 sets the judgment result H2 of the command queue 32 indicated by the write pointer WP to "0b00". As is well known, "0b" in "0b00", "0b10", "0b11", or the like indicates that the value indicated thereby is a binary value.

Next, in step S6, the command transfer unit 31 judges whether the judgment result H2 is "0b11". In this case, the judgment result H2 is "0b00" and the judgment result in step S6 is NO, and the process returns to step S1. When the process returns to step S1, the write pointer WP is updated from "0" to "1".

Next, a description will be given of the operation of the data coupling unit 30 when receiving the command transfer request CR corresponding to the data DATA2, by referring to FIGS. 10, 12A, and 12B.

When the command transfer request CR corresponding to the data DATA2 is received from the write arbitration unit 28A after the process returns to step S1, the process advances to step S3. In this state, because the bus master number NBc identical to the bus master number NB ("1" in this example) output from the write arbitration unit 28A is stored in the retaining unit 35, the judgment result in step S3 is YES and the process advances to step S7.

In step S7, the buffer management unit 34 retrieves the transaction number NTc within the retaining unit 35 in a descending order starting from the transaction number NT ("0" in this example) retained in the number assigning unit 36. In addition, the buffer management unit 34 selects the line number NL ("0" in this example) of the retaining unit 35 retaining the most recent transaction number NT ("0" in this example), based on a retrieval result.

In step S8, the command transfer unit 31 compares an address value computed from the address ADc and the size Sc retained in the line buffer Lc having the selected line number NL, and the address AD of the received command transfer request CR (command transfer request CR corresponding to the data DATA2 in this example), and judges whether the two compared addresses are consecutive addresses.

Figure 12A:
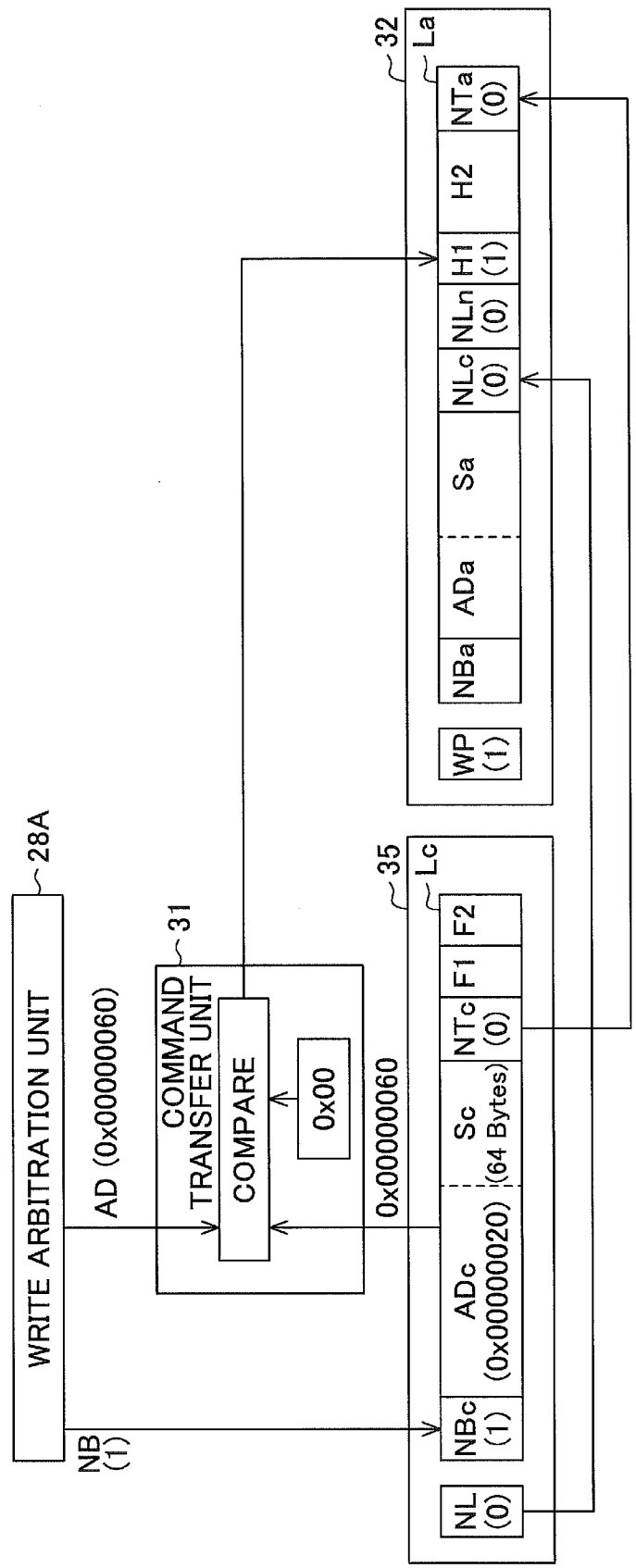
FIGS. 12A and 12B are diagrams for explaining the reception process for receiving the command transfer request.
Figure 12B:
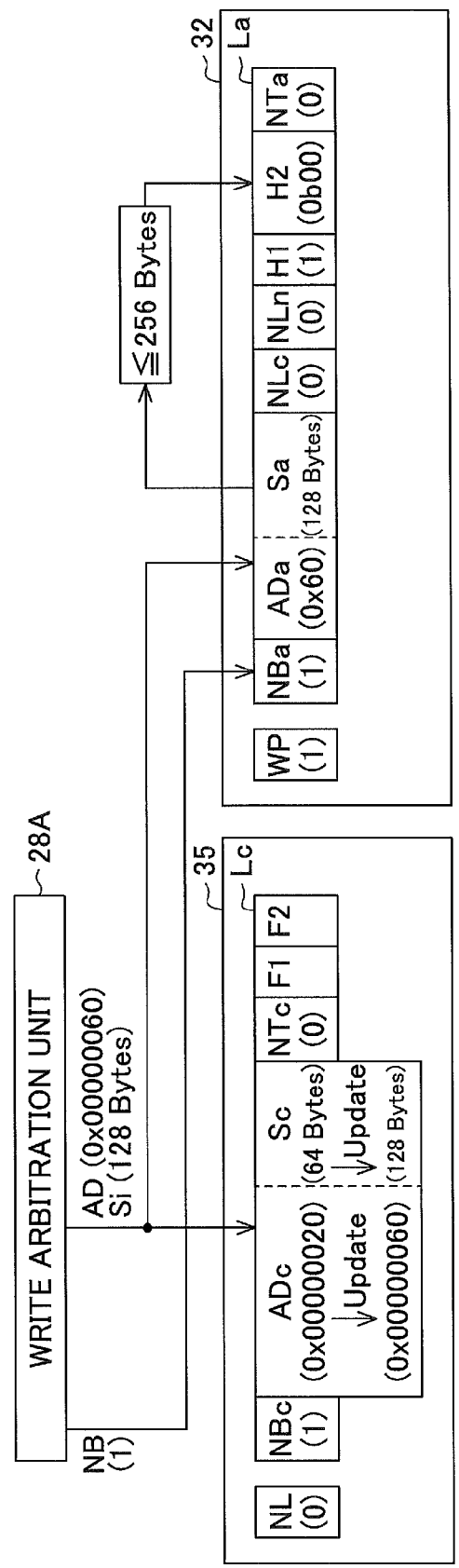

As illustrated in FIG. 12A, the address value (=0x00000060) is computed by adding the size Sc (=0x00000040) to the address ADc (=0x00000020) retained in the line buffer Lc at the line number NL that is "0". This computed address value and the address AD ("0x00000060" in this example) output from the write arbitration unit 28A are compared. In this case, the two compared address values match. In other words, the two address values are consecutive addresses, and thus, the judgment result in step S8 is YES and the process advances to step S9. In a case in which the two compared address values do not match, that is, the two address values are not consecutive addresses, the judgment result in step S8 is NO and the process returns to step S4.

Next, in step S9, the command transfer unit 31 judges whether the address AD[7:0] is other than "0x00". In other words, a judgment is made to determine whether the address AD[7:0] becomes a first address (that is, a first address of each line buffer Lfg of the buffer unit 37) of the arbitrary burst length. In a case in which the address AD[7:0] is other than "0x00", the command transfer request CR (command transfer request CR corresponding to the data DATA2 in this example) retained in the command queue 32 can be coupled with respect to the line buffer Lc at the line number NL ("0" in this example) selected in step S7. Hence, in this case, the judgment result in step S9 is YES and the process advances to step S10. On the other hand, in a case in which the address AD[7:0] is "0x00", the command transfer request CR cannot be coupled with respect to the line buffer Lc at the line number NL selected in step S7, and the command transfer request CR needs to be retained at a new line number NL of the retaining unit 35. Thus, in this latter case, the judgment result in step S9 is NO and the process advances to step S12. In this example, the address AD[7:0] of the command transfer request CR corresponding to the data DATA2 is "0x60" and is other than "0x00", and thus, the process advances to step S10.

Next, as illustrated in FIG. 12A, the command transfer unit 31 in step S10 retains "0", indicating that the addresses are consecutive addresses, in the judgment result H1 indicated by the write pointer WP ("1" in this example). The command transfer unit 31 retains the line number NL ("0" in this example) selected in step S7, as the line number NLc indicated by the write pointer WP. The buffer management unit 34 retains the transaction number NTc ("0" in this example) retained in the line buffer Lc at the line number NL that is "0", as the transaction number NTa indicated by the write pointer WP. In addition, as illustrated in FIG. 12B, the command transfer unit 31 retains the bus master number NB ("1" in this example) from the write arbitration unit 28A, as the bus master number NBa indicated by the write pointer WP ("1" in this example). The command transfer unit 31 retains the address AD[7:0] and the size Si from the write arbitration unit 28A, as the address ADa and the size Sa indicated by the write pointer WP. In addition, the buffer management unit 34 updates the address ADc and the size Sc in the line buffer Lc at the line number NL that is "0" to "0x00000060" which is the same as the address AD and "128 bytes" which is the same as the size Si, respectively.

By carrying out the process of step S10 described above, the added value (=224 bytes) is computed in step S5 which follows, by adding the size Sa (128 bytes in this example) to the address ADa ("0x60" in this example) indicated by the write pointer WP. In this state, the added value becomes smaller than 256 bytes, and thus, the command transfer unit 31 sets the judgment result H2 indicated by the write pointer WP to "0b00". For this reason, the judgment result H2 is not "0b11" and the judgment result in step S6 is NO, and the write pointer WP is updated from "1" to "2" when the process returns to step S1.

Next, a description will be given of the operation of the data coupling unit 30 when receiving the command transfer request CR corresponding to data DATA3, by referring to FIGS. 10, 13A, and 13B.

When the command transfer request CR corresponding to the data DATA3 is received from the write arbitration unit 28A after the process returns to step S1, the process advances to step S3. In this state, because the bus master number NBc identical to the bus master number NB ("1" in this example) output from the write arbitration unit 28A is stored in the retaining unit 35, the judgment result in step S3 is YES and the process advances to step S7. In step S7, the buffer management unit 34 selects the line number NL ("0" in this example) of the retaining unit 35 retaining the most recent transaction number NT ("0" in this example).

Figure 13A:
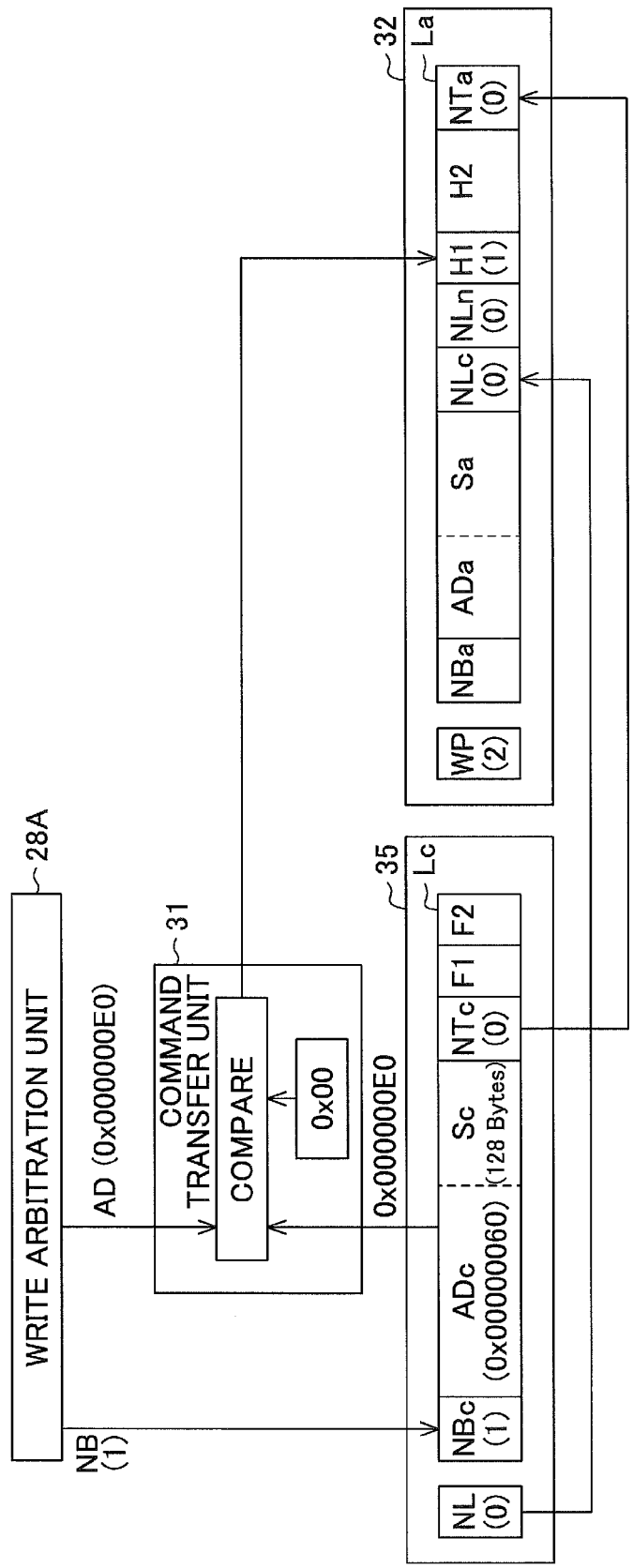
FIGS. 13A and 13B are diagrams for explaining the reception process for receiving the command transfer request.
Figure 13B:
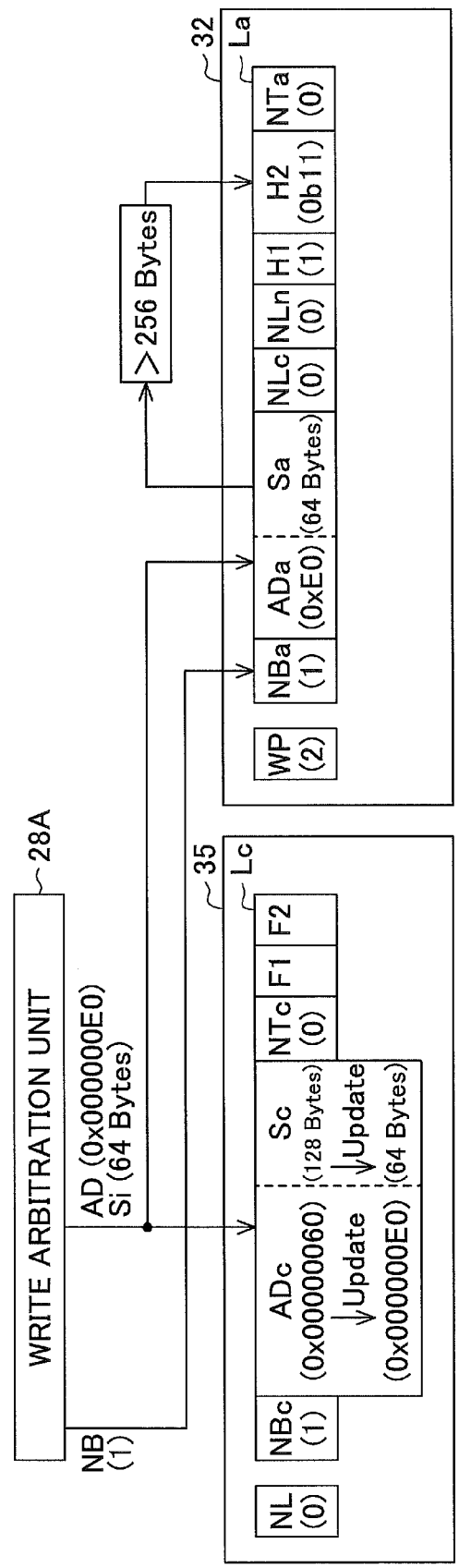

Next, as illustrated in FIG. 13A, the address value (=0x000000E0) is computed by adding the size Sc (=128 bytes) to the address ADc (=0x00000060) retained in the line buffer Lc at the line number NL that is "0". This computed address value and the address AD ("0x000000E0" in this example) output from the write arbitration unit 28A match in this case, and the process advances to step S9. In this case, the address AD[7:0] is other than "0x00", and the judgment result in step S9 is YES, and the process advances to step S10.

Next, the command transfer unit 31 in step S10 retains "1" in the judgment result H1 indicated by the write pointer WP ("2" in this example), according to the judgment result in step S8. The command transfer unit 31 retains the line number NL ("0" in this example) selected in step S7, as the line number NLc indicated by the write pointer WP. The buffer management unit 34 retains the transaction number NTc ("0" in this example) retained in the line buffer Lc at the line number NL that is "0", as the transaction number NTa indicated by the write pointer WP. In addition, as illustrated in FIG. 13B, the command transfer unit 31 retains the bus master number NB ("1" in this example) from the write arbitration unit 28A, as the bus master number NBa indicated by the write pointer WP ("2" in this example). The command transfer unit 31 retains the address AD[7:0] and the size Si from the write arbitration unit 28A, as the address ADa and the size Sa indicated by the write pointer WP. In addition, the buffer management unit 34 updates the address ADc and the size Sc in the line buffer Lc at the line number NL that is "0" to "0x000000E0" which is the same as the address AD and "128 bytes" which is the same as the size Si, respectively.

By carrying out the process of step S10 described above, the added value (=288 bytes) is computed in step S5 which follows, by adding the size Sa (64 bytes in this example) to the address ADa ("0xE0" in this example) indicated by the write pointer WP. In this state, the added value becomes larger than 256 bytes, and thus, the command transfer unit 31 sets the judgment result H2 indicated by the write pointer WP to "0b11". For this reason, the judgment result H2 becomes equal to "0b11" and the judgment result in step S6 is YES, and the process advances to step S11.

Next, as illustrated in FIG. 14, the command transfer unit 31, in step S11, acquires a vacant line number (line number "1" in this example) of the buffer unit 37, and retains the vacant line number "1" as a line number NLn indicated by the write pointer WP ("2" in this example). FIG. 14 is a diagram for explaining the reception process for receiving the command transfer request. In other words, the line number NL indicated by the write pointer WP that is "2" is updated from "0" to "1". The buffer management unit 34 computes an address ADcc and a size Scc corresponding to an amount exceeding 1 line (256 bytes) of the buffer unit 37, from the address ADc and the size Sc retained in the line buffer Lc at the line number NL that is "0". For example, the buffer management unit 34 computes the address ADcc[8] by inverting the original address ADc[8] retained in the line buffer Lc at the line number NL that is "0", and sets the address ADcc[7:0] to "0x00". In addition, the address ADcc [31:9] is maintained to the original address ADc[31:9]. As a result, the address ADcc[31:0] corresponding to the amount exceeding 256 bytes is computed. Furthermore, the size Scc corresponding to the amount exceeding 256 bytes is computed by adding the original size Sc retained in the line buffer Lc at the line number NL that is "0", with respect to the original address ADc[7:0], in order to obtained an added value, and subtracting 256 bytes from this added value. In this example, the address ADcc[31:0] becomes "0x00000100" because the original address ADc[31:0] is "0x000000E0". In addition, because the original address ADc[7:0] is "0xE0" and the original size Sc is 64 bytes, the size Scc becomes 32 (=288−256) bytes. The buffer management unit 34 retains the computed address ADcc and the computed size Scc, as the address ADc and the size Sc at the line number NL that is the same as the vacant line number "1" retained in the line number NLn indicated by the write pointer WP ("2" in this example). Moreover, the number assigning unit 36 generates a new transaction number NT ("1" in this example). The number assigning unit 36 retains this new transaction number NT as the transaction number NTa indicated by the write pointer WP and as the transaction number NTc at the line number NL that is "1". Accordingly, the transaction number NTa indicated by the write pointer WP is updated from "0" to "1".

When the process of step S11 described above ends, the 3 command transfer requests CR corresponding to the data DATA1 through DATA3 are received by the command transfer unit 31, and the buffer information for coupling the 3 command transfer requests CR is retained in the retaining unit 35.

Although not generated in the example described above in conjunction with FIG. 9, in a case in which the address AD[7:0] becomes "0x00" in step S9, the judgment result in step S9 becomes NO and the process advances to step S12. The command transfer unit 31, in step S12, retains "1" in the judgment result H1 indicated by the write pointer WP, according to the judgment result in step S8. The command transfer unit 31 acquires the vacant line number of the buffer unit 37, and retains the acquired vacant line number in the line number NLc indicated by the write pointer WP. The number assigning unit 36 generates a new transaction number NT, and retains this new transaction number NT in the command queue 32 and the retaining unit 35. The command transfer unit 31 retains the bus master number NB, the address AD[7:0], and the size Si output from the write arbitration unit 28A in the command queue 32 indicated by the write pointer WP. In addition, the buffer management unit 34 retains the bus master number NB, the address AD, and the size Si output from the write arbitration unit 28A in the line buffer Lc at the line number NL that is the same as the vacant line number retained in the line number NLc. After the process of step S12 described above is carried out, the process advances to step S5.

Figure 15:
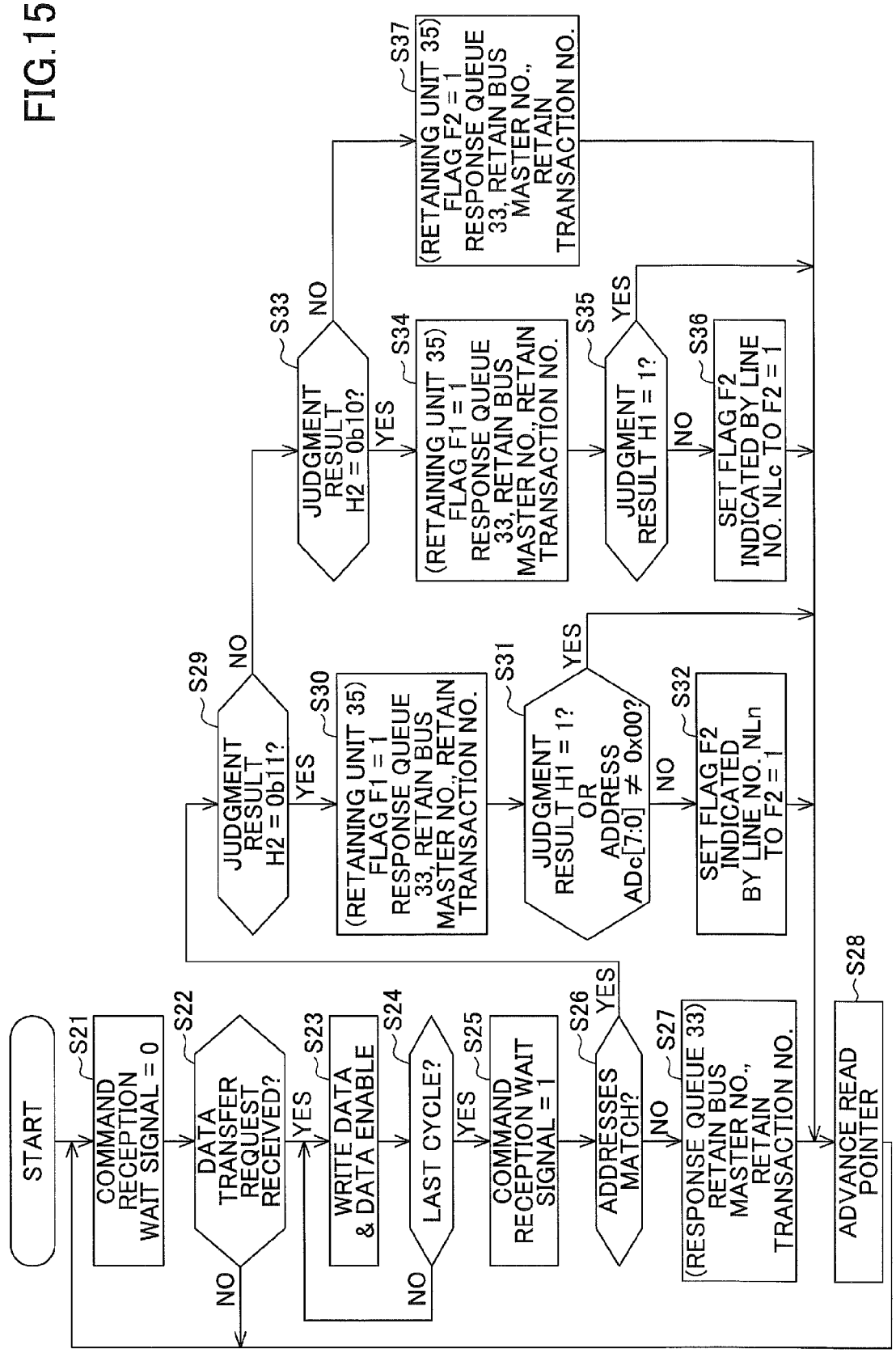
FIG. 15 is a flow chart for explaining the reception process for receiving the command transfer request.
Figure 16:
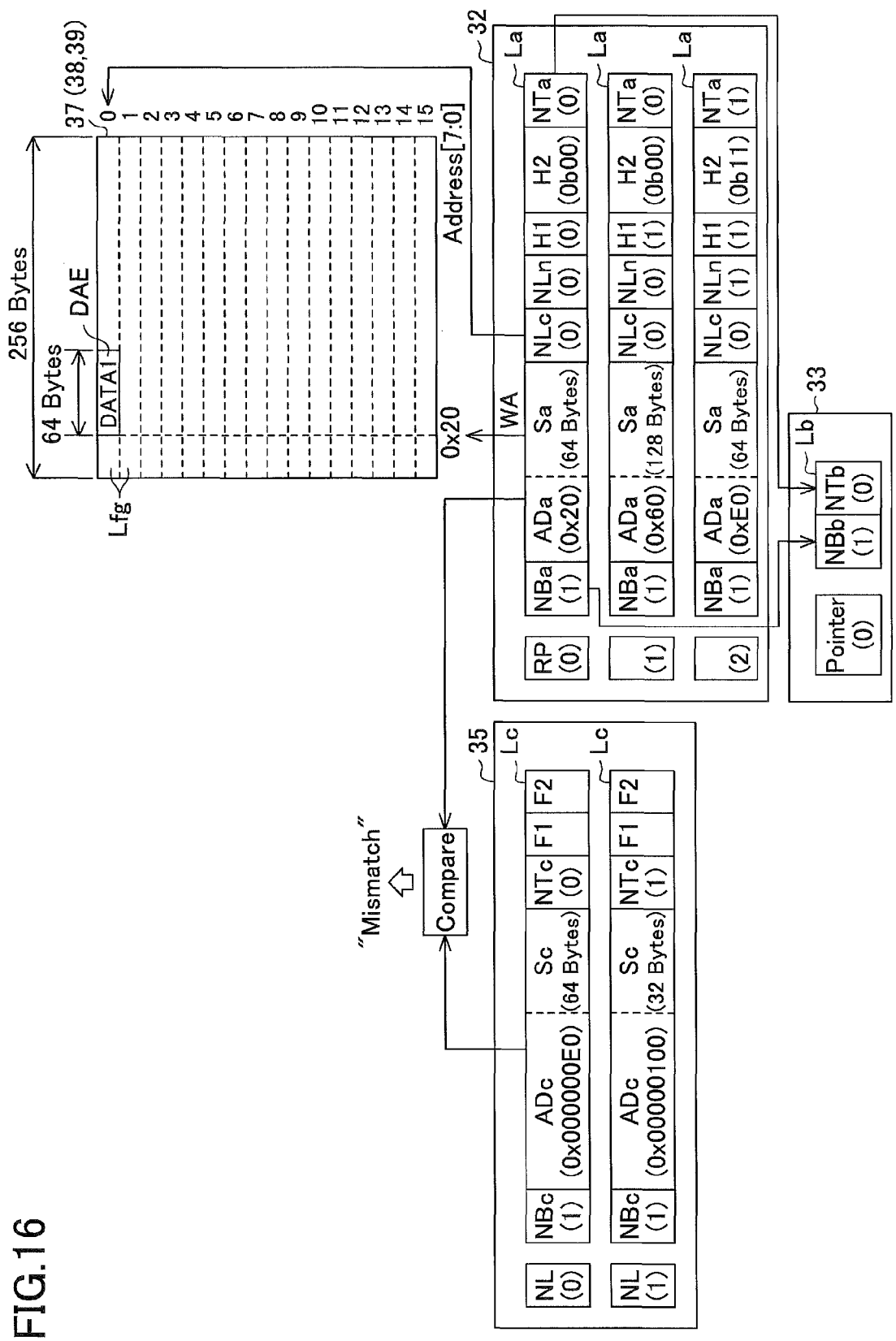
FIG. 16 is a diagram for explaining the reception process for receiving the command transfer request.
Figure 17:
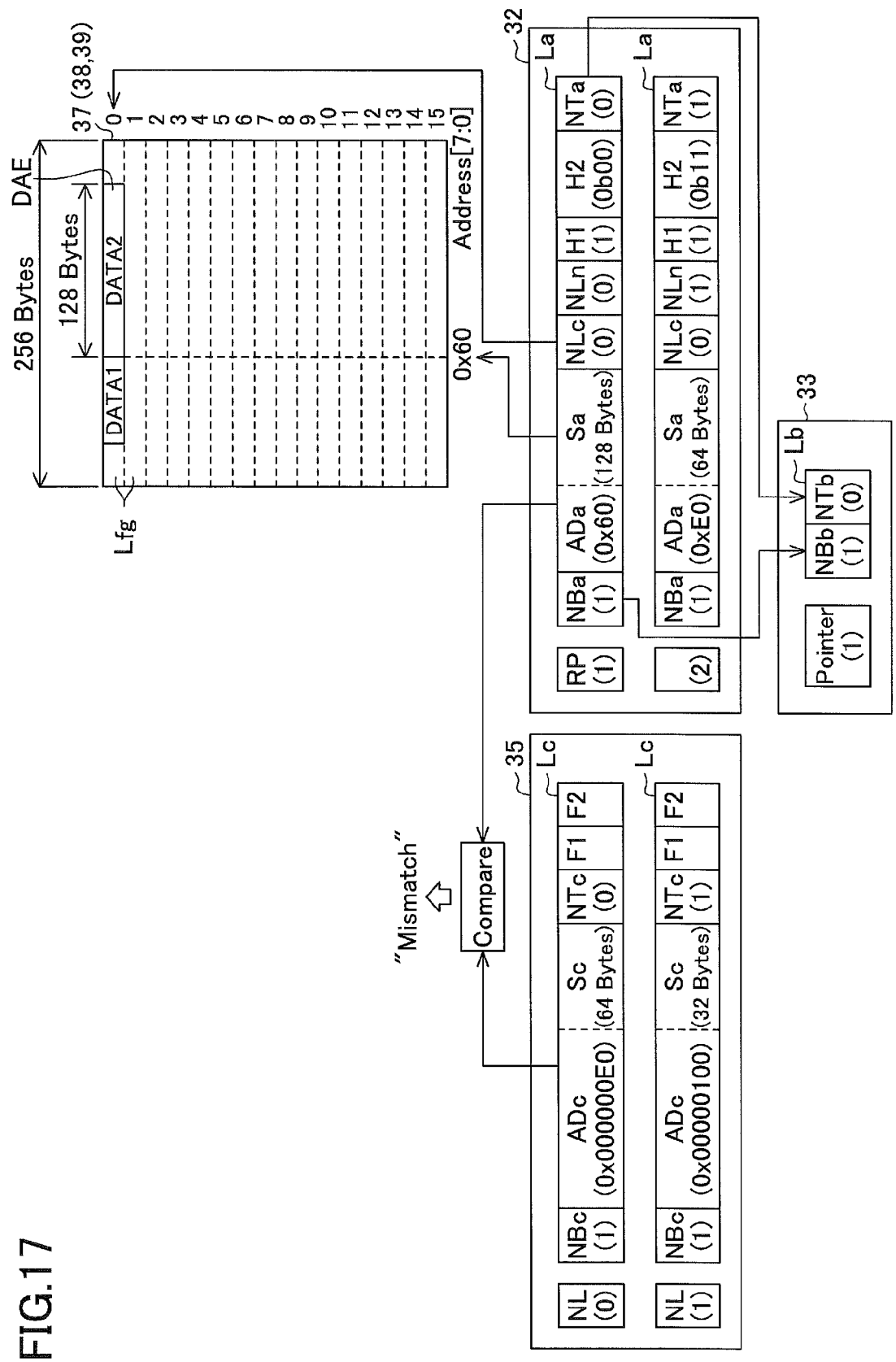
FIG. 17 is a diagram for explaining the reception process for receiving the command transfer request.
Figure 18:
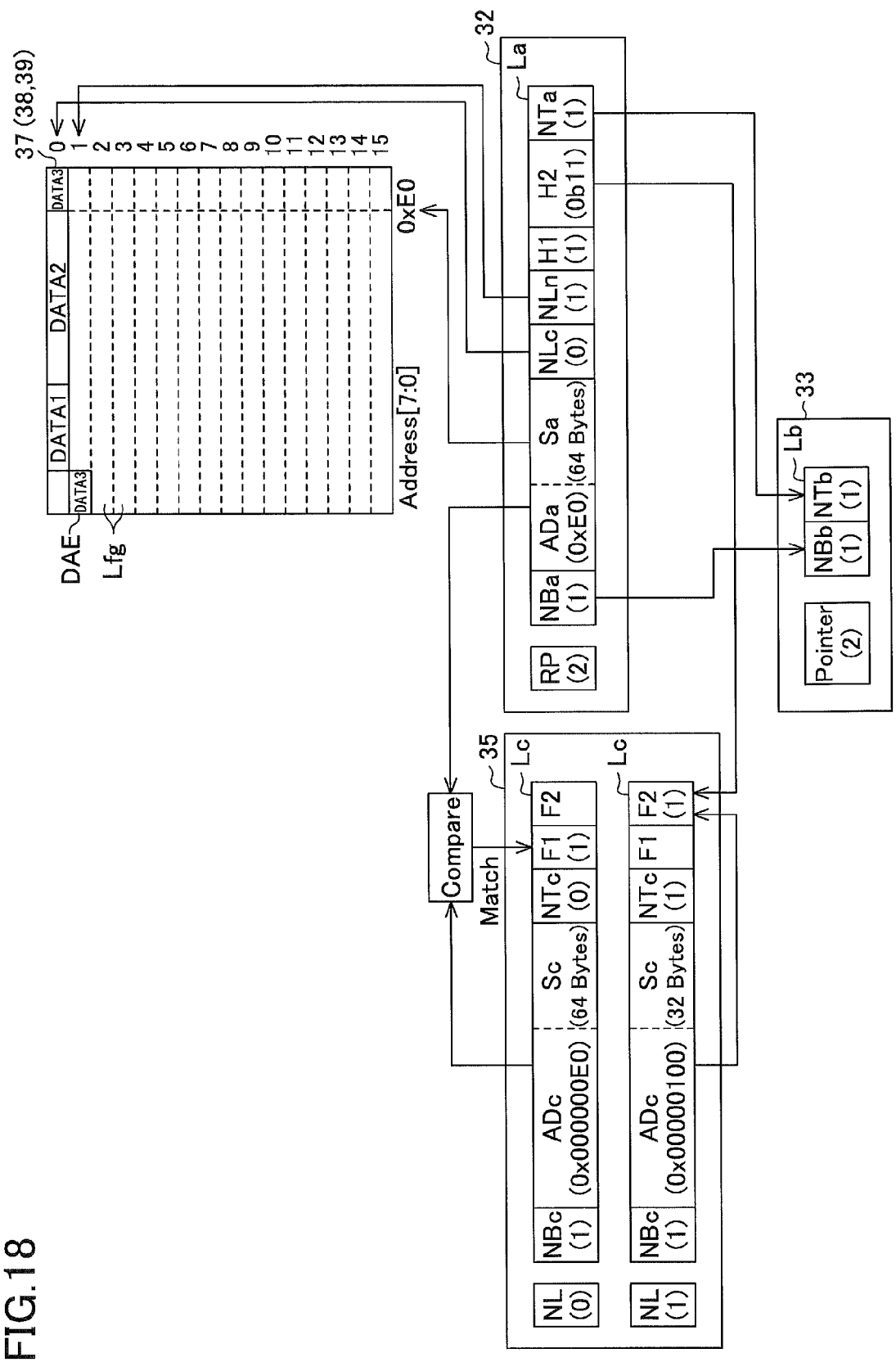
FIG. 18 is a diagram for explaining the reception process for receiving the command transfer request.

Next, a description will be given of the operation of the data coupling unit 30 when receiving the data transfer request DR from the write arbitration unit 28A, by referring to FIGS. 15 through 18. FIG. 15 is a flow chart for explaining the reception process for receiving the command transfer request, and FIGS. 16 through 18 are diagrams for explaining the reception process for receiving the command transfer request. First, a description will be given of the operation of the data coupling unit 30 when receiving the data transfer request DR corresponding to the data DATA1 described above, by referring to FIGS. 15 and 16.

In step S21 illustrated in FIG. 15, the command transfer unit 31 sets the command reception wait signal to "0". Next, the command transfer unit 31, in step S22, judges whether the data transfer request DR is received from the write arbitration unit 28A, and steps S21 and S22 are repeated until the data transfer request DR is received.

Thereafter, when the data transfer request DR corresponding to the data DATA1 is received, the process advances to step S23.

Next, in step S23, the command transfer unit 31 generates a write control signal WE that permits writing of the data DA and the data enable EN with respect to the buffer unit 37. In addition, the command transfer unit 31 generates a write address WA based on the line number NLc and the address ADa retained in the command queue 32. In this example, as illustrated in FIG. 16, the write address WA is generated from the line number NLc ("0" in this example) and the address ADa ("0x20" in this example) retained in the command queue 32 that is indicated by the read pointer RP ("0" in this example). The 64-byte data DATA1 (data DA and data enable EN) is written to the buffer unit 37, using the write address WA ("0x020" in this example) as the start address. In this state, as illustrated in FIG. 9C, the initial value "0" is stored from the address "0x00" to the address "0x1F" of the data enable retaining unit 39 at the line number "0". Accordingly, the data DA (initial value "0" in this example) retained at the line number "0" of the data retaining unit 38 from the address "0x00" to the address "0x1F" is invalidated and "invalid".

The 64-byte data DATA1 described above is successively written to the line buffer Lfg at the line number "0", and in step S24, the command transfer unit 31 judges whether a last burst cycle in which the last data of the 64-byte data DATA1 is written is reached. When the judgment result in step S24 is YES, the command transfer unit 31, in step S25, sets the command reception wait signal to "1". As a result, in the process of steps S1 through S12 illustrated in FIG. 10, step S1 is repeated until the command reception signal becomes "0", and the process of steps S2 through S12 is interrupted. In other words, by setting the command reception wait signal to "1", the updating of the command queue 32 and the retaining unit 35 is interrupted. More particularly, because an operation is carried out with respect to the command queue 32 and the retaining unit 35 in order to judge a completion of the coupling in the last cycle of the data transfer to the buffer unit 37, the updating of the command queue 32 and the retaining unit 35 is interrupted when the last cycle is reached. Further, in the state in which the updating of the command queue 32 and the retaining unit 35 is interrupted, the data coupling unit 30 carries out the process of steps S26 through S37 to be described later. During a data transfer cycle other than the last burst cycle, the process of steps S2 through S12 continues to be carried out.

Next, in step S26, the command transfer unit 31 judges whether the address ADa of the command queue 32 matches the address ADc[7:0] retained in the line buffer Lc at the line number NL that is the same as the line number NLc of the command queue 32. In this example, the address ADa ("0x20" in this example) indicated by the read pointer RP ("0" in this example) does not match the address ADc[7:0] of the line buffer Lc at the line number NL that is the same as the line number NLc ("0" in this example) indicted by the read pointer RP. In a case in which the judgment result in step S26 is NO, it means that the command transfer requests CR of the subsequent consecutive addresses exist within the command queue 32. In this case, the command transfer unit 31, in step S27, moves the bus master number NBa ("1" in this example) and the transaction number NTa ("0" in this example) indicated by the read pointer RP to the response queue 33 indicated by the pointer "0". Thereafter, the command transfer unit 31, in step S28, advances the read pointer RP of the command queue 32 from "0" to "1", and the process returns to step S21.

Next, a description will be given of the operation of the data coupling unit 30 when receiving the data transfer request DR corresponding to the data DATA2, by referring to FIGS. 15 and 17.

When the process returns to step S21 from step S28, the command reception wait signal is set to "0", as described above. As a result, the process of steps S2 through S12 illustrated in FIG. 10 is resumed. Thereafter, when the command transfer unit 31 receives the data transfer request DR corresponding to the data DATA2, the command transfer 31 carries out the process of step S23. Hence, as illustrated in FIG. 17, the 128-byte data DATA2 is written to the buffer unit 37 using the line number NLc ("0" in this example) and the address ADa ("0x60" in this example) indicated by the read pointer RP ("1" in this example) as the start address. As a result, the data DATA1 and DATA2 corresponding to the 2 transfer requests are consecutively retained at the consecutive addresses of the buffer unit 37. In other words, the data DATA1 and DATA2 corresponding to the 2 transfer requests are coupled within the buffer unit 37.

Next, when the last cycle of the data transfer to the buffer unit 37 is reached, the command transfer unit 31, in step S25, sets the command reception wait signal to "1", and thereafter carries out the process of step S26. In this case, the address ADa ("0x60" in this example) indicated by the read pointer RP does not match the address ADc[7:0] ("0xE0" in this example) retained in the line buffer Lc at the line number NL that is the same as the line number NLc ("0" in this example) indicated by the read pointer RP. For this reason, the judgment result in step S26 is NO, and the data transfer unit 31, in step S27, moves the bus master number NBa ("1" in this example) and the transaction number NTa ("0" in this example) indicated by the read pointer RP to the response queue 33 indicated by the pointer "1". Thereafter, in step S28, the data transfer unit 31 advances the read pointer RP from "1" to "2", and the process returns to step S21.

Next, a description will be given of the operation of the data coupling unit 30 when receiving the data transfer request DR corresponding to the data DATA3, by referring to FIGS. 15 and 18.

When the process returns to step S21 from step S28, the command reception wait signal is set to "0", as described above. Thereafter, when the command transfer unit 31 receives the data transfer request DR corresponding to the data DATA3, the command transfer 31 carries out the process of step S23. Hence, as illustrated in FIG. 18, the 64-byte data DATA3 is written to the buffer unit 37 using the line number NLc ("0" in this example) and the address ADa ("0xE0" in this example) indicated by the read pointer RP ("2" in this example) as the start address. In this state, because the judgment result H2 is "0b11", after writing the data DATA3 with respect to the line buffer Lfg at the line number "0" (that is, after writing the data DATA3 amounting to 32 bytes), the data DATA3 amounting to the remaining 32 bytes is consecutively written with respect to the line buffer Lfg at the line number "1". The data DATA3 amounting to the remaining 32 bytes is written using the address "0x00" of the line buffer Lfg at the line number "1" as the start address.

Next, when the last cycle of the data transfer to the buffer unit 37 is reached, the command transfer unit 31, in step S25, sets the command reception wait signal to "1", and thereafter carries out the process of step S26. In this case, the address ADa ("0xE0" in this example) indicated by the read pointer RP ("2" in this example) matches the address ADc[7:0] ("0xE0" in this example) retained in the line buffer Lc at the line number NL that is the same as the line number NLc ("0" in this example) indicated by the read pointer RP. In a case in which the judgment result in step S26 is YES, it means that the command transfer requests CR of the subsequent consecutive addresses do not exist within the command queue 32. In this case, the process advances to step S29.

Next, in step S29, the command transfer unit 31 judges whether the judgment result H2 is "0b11". In this case, the judgment result H2 indicated by the read pointer RP is "0b11", and the judgment result in step S29 is YES, and thus, the process advances to step S30.

Next, in step S30, the command transfer unit 31 retains "1", which indicates that the data coupling process amounting to 1 line of the buffer unit 37 is complete, in the flag F1 of the line buffer Lc at the line number NL that is the same as the line number NLc ("0" in this example) indicated by the read pointer RP ("2" in this example). In addition, in step S30, the command transfer unit 31 moves the bus master number NBa ("1" in this example) and the transaction number NTa ("1" in this example) indicated by the read pointer RP to the response queue 33 indicated by the pointer "2". The transaction number NTb is retained in the response queue 33, because when returning the write complete notification WC1 from the memory I/F 29 with respect to the bus master, the write complete notification WC1 needs to be returned by a write complete notification to the command transfer request CRa after the coupling including the data of the last cycle. More particularly, in a case in which a plurality of command transfer requests CR are coupled into a single command transfer request CRa, the write complete notification WC1 is output from the memory I/F 29 with respect to the single command transfer request CRa after the coupling. For this reason, the transaction number NTb is retained in the response queue WC1 in order to make a single write complete notification WC1 correspond to the plurality of command transfer requests CR before the coupling.

In step S31, the command transfer unit 31 checks the read pointer RP of the command queue 32 in an ascending order, and judges whether the judgment result H1 of the line retaining the same bus master number NBa is "1". In addition, in step S31, the command transfer unit 31 judges whether the address ADc[7:0] retained in the line buffer Lc at the line number NL that is the same as the line number NLn is other than "0x00". In a case in which the judgment result H1 is "0" or the address ADc[7:0] is "0x00" and the judgment result in step S31 is NO, the process advances to step S32. On the other hand, in a case in which the judgment result H1 is "1" or the address ADc[7:9] is other than "0x00" and the judgment result in step S31 is YES, the command transfer unit 31, in step S28, advances the read pointer RP, and the process returns to step S21.

In step S32, the command transfer unit 31 retains "1" which indicates that the data coupling process of the corresponding bus master is interrupted at a size less than 1 line of the buffer unit 37, in the flag F2 of the line buffer Lc at the line number NL that is the same as the line number NLn.

In this example, as illustrated in FIG. 18, the judgment result H2 indicated by the read pointer RP ("2" in this example) is "0b11" in step S31, and the address ADc[7:0] of the line buffer Lc at the line number NL that is the same as the line number NLn ("1" in this example) is not updated from "0x00". This indicates that the command transfer requests CR of the subsequent successive addresses do not exist within the command queue 32. For this reason, the command transfer unit 31, in step S32, sets "1" in the flag F2 of the line buffer Lc at the line number NL that is "1". Accordingly, the command transfer unit 31, in step S31, judges whether the command transfer requests CR of the subsequent consecutive addresses exists within the command queue 32. Further, the command transfer unit 31 sets "1" in the flag F2 within the retaining unit 35 in the case in which the command transfer requests CR of the subsequent consecutive addresses exist within the command queue 32.

Thereafter, the command transfer unit 31, in step S28, advances the read pointer RP, and the process returns to step S21.

On the other hand, in a case in which the judgment result H2 is other than "0b11" and the judgment result in step S29 is NO, the process advances to step S33. In step S33, the command transfer unit 31 judges whether the judgment result H2 is "0b10". For example, in a case in which the judgment result H2 is "0b10" and is equal to the arbitrary burst length (the data size after the coupling is the data size amounting to 1 line of the buffer unit 37), the process advances to step S34.

Next, in step S34, the command transfer unit 31 sets "1" in the flag F1 of the retaining unit 35. In addition, in step S34, the command transfer unit 31 moves the bus master number NBa and the transaction number NTa indicated by the read pointer RP to the response queue 33.

In step S35, the command transfer unit 31 checks the read pointer RP in an ascending order, and judges whether the judgment result H1 of the line La retaining the same bus master number NBa is "1". In a case in which the judgment result H1 is "1" and the judgment result in step S35 is YES, the command transfer unit 31, in step S28, advances the read pointer RP, and the process returns to step S21. On the other hand, in a case in which the judgment result H1 is "0" and the judgment result in step S35 is NO, it means that the command transfer requests CR of the subsequent consecutive addresses do not exist within the command queue 32. In this case, the command transfer unit 31, in step S36, sets "1" in the flag F2 of the line buffer Lc at the line number NL that is the same as the line number NLc. This flag F2 indicates that the data coupling process of the corresponding bus master is interrupted. After setting the flag F2, the command transfer unit 31, in step S28, advances the read pointer RP, and the process returns to step S21.

On the other hand, in a case in which the judgment result H2 in step S33 is "0b00", that is, the data size after the coupling is smaller than the arbitrary burst length (data size amounting to 1 line of the buffer unit 37) and the judgment result in step S33 is NO, the process advances to step S37. In this case in which the judgment result H2 in step S33 is "0b00", it indicates that the command transfer requests CR of the subsequent consecutive addresses do not exist in the command queue 32, and the command transfer unit 31, in step S37, sets "1" in the flag F2 of the line buffer Lc at the line number NL that is the same as the line number NLc. This flag F2 indicates that the data coupling process of the corresponding bus master is interrupted. In addition, the command transfer unit 31, in step S37, moves the bus master number NBa and the transaction number NTa indicated by the read pointer RP to the response queue 33. Thereafter, the command transfer unit 31, in step S28, advances the read pointer RP, and the process returns to step S21.

Next, a description will be given of the operation of the data coupling unit 30 after the data coupling within the buffer unit 37, by referring to FIGS. 19 through 25.

Figure 19:
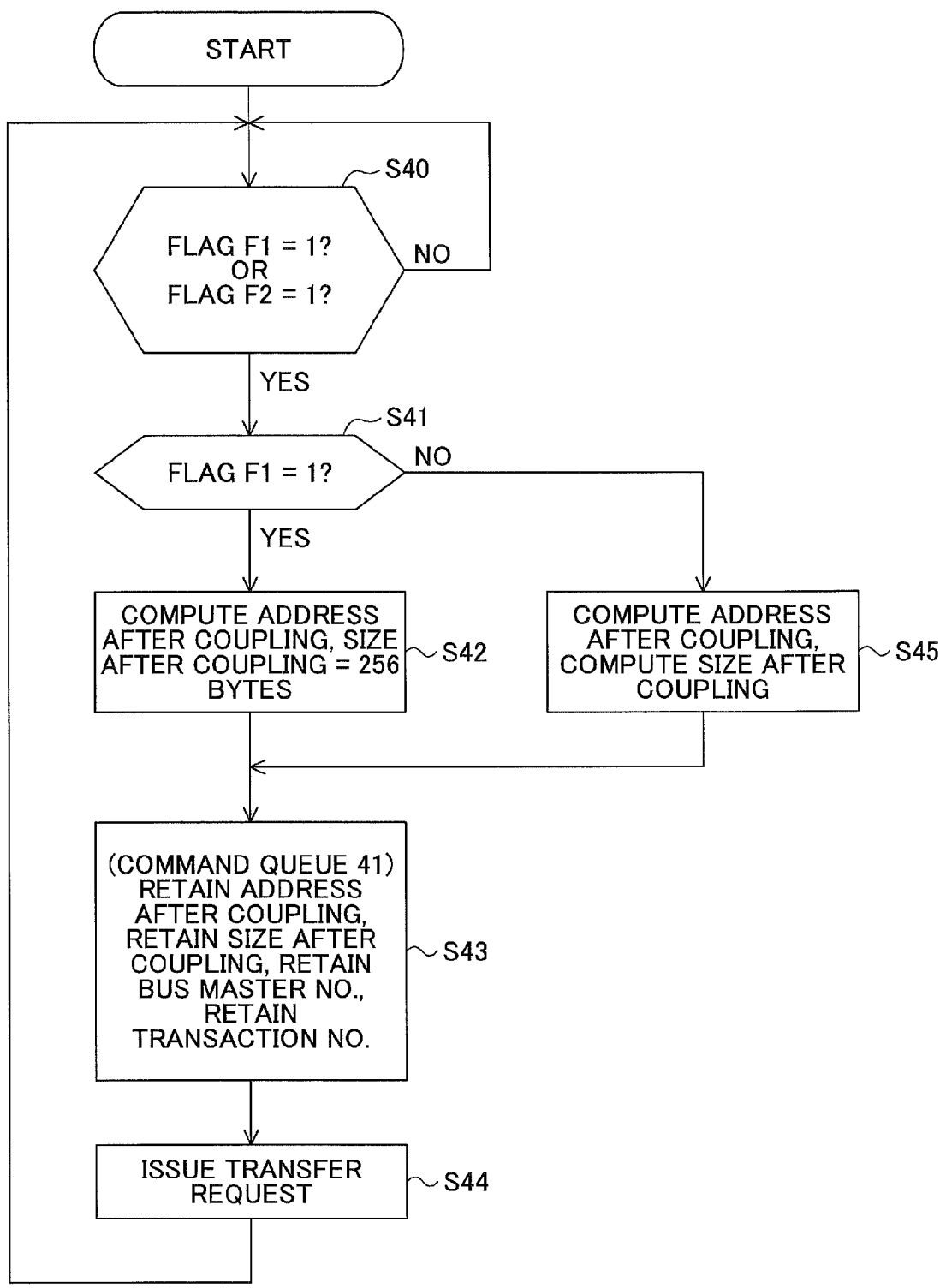
FIG. 19 is a flow chart for explaining a generation process for generating a command transfer request after coupling.

FIG. 19 is a flow chart for explaining a generation process for generating the command transfer request after coupling. First, in step S40 illustrated in FIG. 19, the coupled command transfer unit 40 monitors the flags F1 and F2 within the retaining unit 35, and judges whether the flag F1 is "1" or whether the flag F2 is "1". The process of step S40 is repeated until one of the flags F1 and F2 becomes "1".

Figure 20:
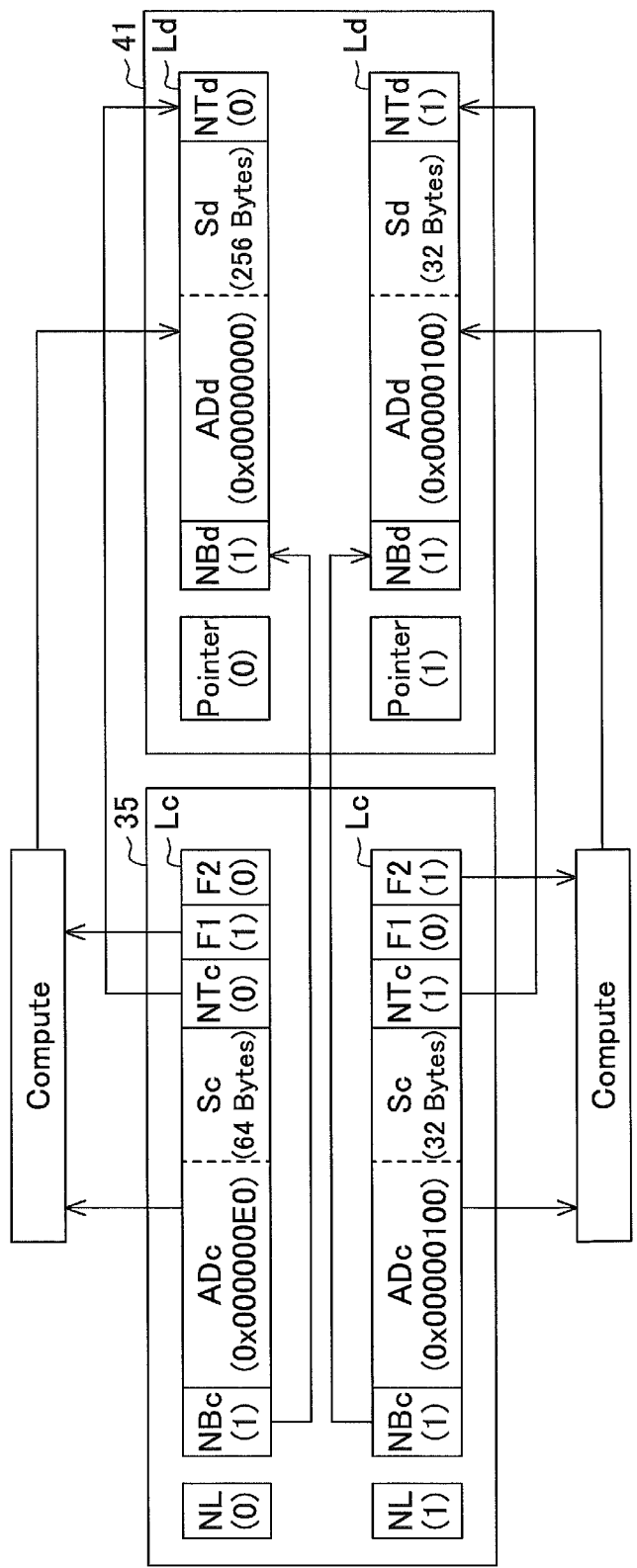
FIG. 20 is a diagram for explaining the generation process for generating the command transfer request after the coupling.

As illustrated in FIG. 20, when the flag F1 of the line buffer Lc at the line number NL that is "0" becomes "1" and the judgment results in steps S40 and S41 become YES, the coupled command transfer unit 40, in step S42, generates the address ADd after the coupling and the size Sd after the coupling, based on the address ADc and the size Sc of the line number NL that is "0". More particularly, the flag F1 that is "1" (F1=1) indicates that the data amounting to 1 line of the buffer unit 37 are coupled. Hence, the coupled command transfer unit 40k, in step S42, sets the size Sd after the coupling to the data size equal to the arbitrary burst length (256 bytes in this example. In addition, the coupled command transfer unit 40 generates the address ADd after the coupling, by retaining the address ADc ("0x000000E0" in this example) of the line number NL that is "0" with respect to the address ADd after the coupling, and thereafter making the lower 8 bits of the address ADd after the coupling "0". In other words, the coupled command transfer unit 40 makes the lower 8 bits of the address ADd after the coupling "0", and retains the upper 24 bits of the address ADc of the line number NL that is "0" in the upper 24 bits of the address ADd after the coupling. For this reason, the address ADd after the coupling of the line number NL that is "0" becomes "0x00000000". As a result, the command transfer request having the data size of the arbitrary burst length (256 bytes in this example) and the start address with the alignment unit of the arbitrary burst length, that is, the command transfer request after the coupling, is generated.

Next, in step S43, the coupled command transfer unit 40 retains in the command queue 41 the address ADd after the coupling and the size Sd after the coupling, that are computed in the above described manner, and the bus master number NBc and the transaction number NTc retained in the line buffer Lc at the line number NL that is "0". In this example, the bus master number NBd that is "1", the address ADd after the coupling that is "0x00000000", the size Sd after the coupling that is "256 bytes", and the transaction number NTd that is "0" are respectively retained in the line Ld of the command queue 41 indicated by the pointer "0". Hence, the command transfer request CRa after the coupling, corresponding to the data stored in the line buffer Lfg at the line number "0", is retained within the command queue 41 indicated by the pointer "0".

After the process of step S43 described above ends, the coupled command transfer unit 40, in step S44, issues the command transfer request CRa after the coupling and the data transfer request DRa after the coupling, that are retained within the command queue 41, with respect to the memory I/F 29. In other words, the command transfer request CRa and the data transfer request DRa, having the address ADd after the coupling ("0x00000000" in this example) and the size Sd after the coupling (256 bytes in this example) are issued with respect to the memory I/F 29. Thereafter, the process returns to step S40 in order to generate the command transfer request CRa after the coupling.

Figure 21:
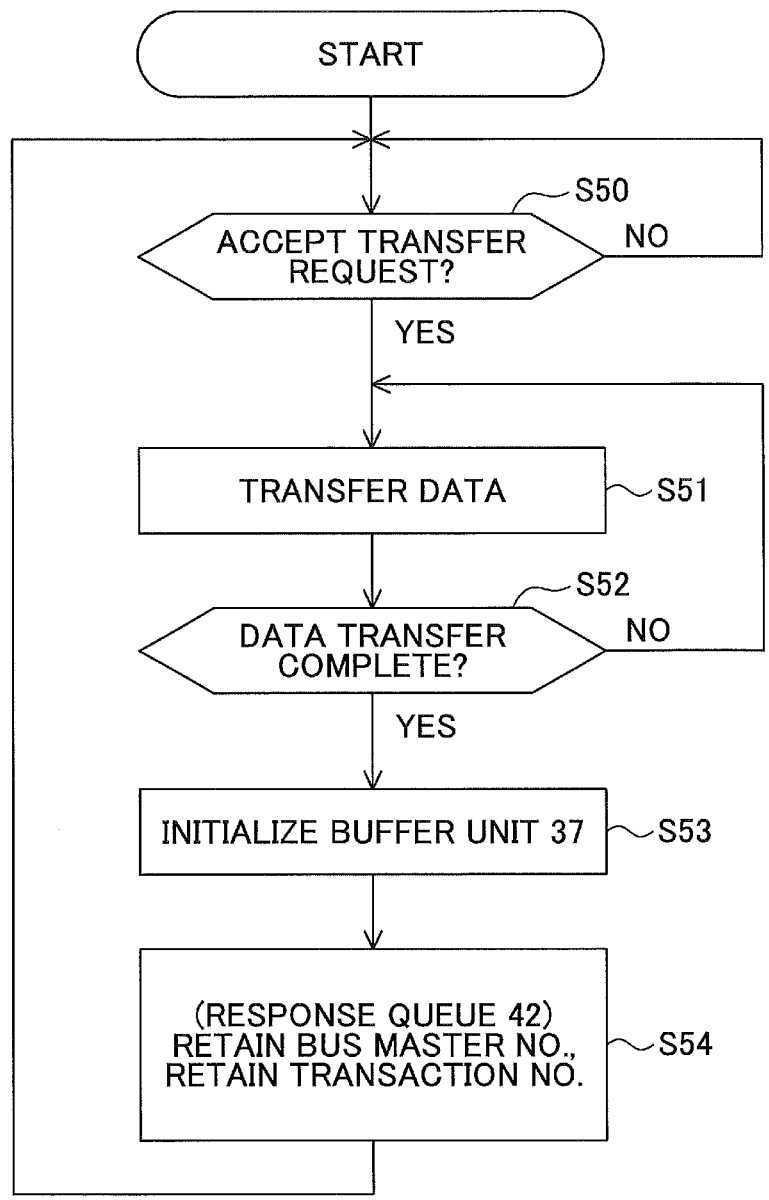
FIG. 21 is a flow chart for explaining a data transfer process after the coupling.

FIG. 21 is a flow chart for explaining a data transfer process after the coupling. In step S50 illustrated in FIG. 21, the coupled command transfer unit 40 waits until a response command with respect to the issued command transfer request CRa and data transfer request DRa is input to the coupled command transfer unit 40 from the memory I/F 29. When the coupled command transfer unit 40 receives the response command and the judgment result in step S50 becomes YES, the coupled command transfer unit 40, in step S1, transfers the data DAa and the data enable ENa amounting to 1 line after the coupling and retained in the line buffers Lf and Lg at the line number "0" to the memory 14 via the memory I/F 29. For example, when the coupled command transfer unit 40 accepts the command transfer request CRa after the coupling and the data transfer request DRa after the coupling, the coupled command transfer unit 40 generates a read control signal RE that permits reading of the data DAa and the data enable ENa. In addition, the coupled command transfer unit 40 sets the lower 12 bits of the address ADd after the coupling, retained in the command queue 41, that is, the 12-bit address ADd[11:0], as the read address RA. Further, the coupled command transfer unit 40 uses the read address RA ("0x000" in this example) as the start address to read the 256-byte data DAa and the data enable ENa from the buffer unit 37 at the line number "0", and transfers the read data DAa and data enable ENa to the memory 14 via the memory I/F 29.

Thereafter, when the data transfer of the 256 bytes is complete and the judgment result in step S52 becomes YES, the coupled command transfer unit 40, in step S53, initializes the buffer unit 37 (the data retaining unit 38 and the data enable retaining unit 39) at the line number "0". By initializing the buffer unit 37 (particularly the data enable retaining unit 39), the data enable EN that is "1" is written only in the part where the data DA from the bus master exists, when writing the transfer data DAE from the bus master into the buffer unit 37 by the process of steps S22 through S24 described above in conjunction with FIG. 15. Accordingly, even when the start address ("0x00000020" in this example) of the transfer request before the coupling is converted into the start address ("0x00000000" in this example) with the alignment unit of the arbitrary burst length, it is possible to prevent an unnecessary write access.

Figure 22:
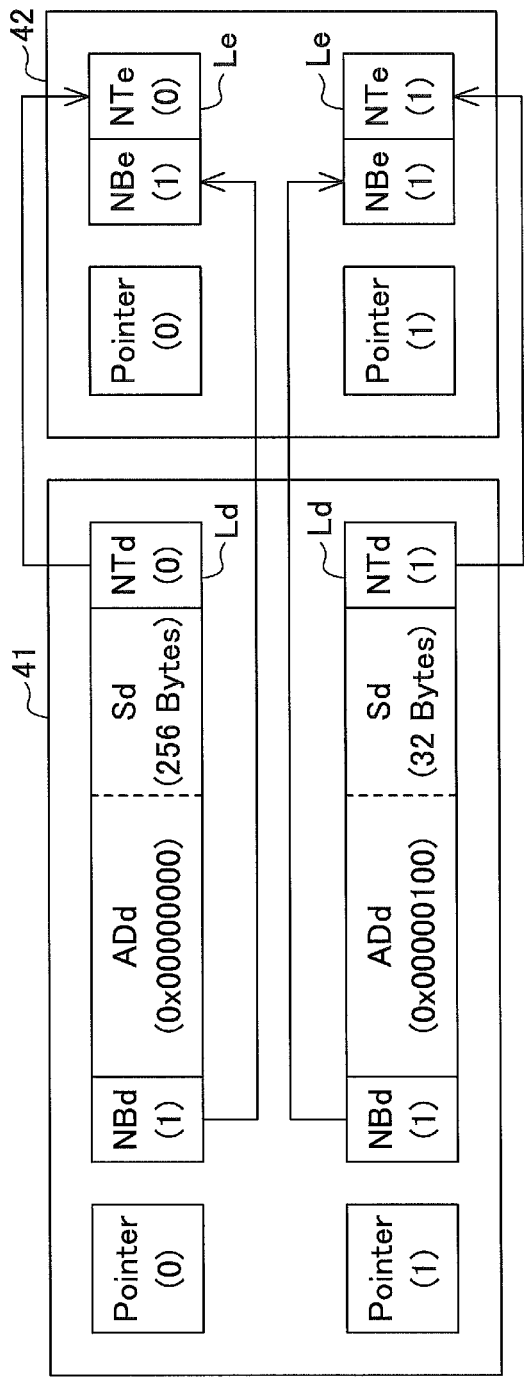
FIG. 22 is a diagram for explaining the data transfer process after the coupling.

Next, as illustrated in FIG. 22, the coupled command transfer unit 40, in step S54, moves the bus master number NBd ("1" in this example) and the transaction number NTd ("0" in this example) of the command queue 41 indicated by the pointer "0" to the response queue 42 indicated by the pointer "0". After the process of step S54, the process returns to step S50 to transfer the coupled data.

Figure 23:
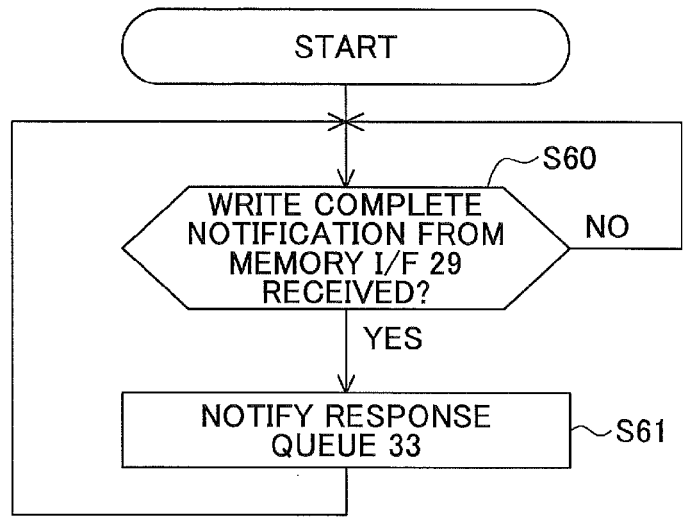
FIG. 23 is a flow chart for explaining a reception process for receiving a write complete notification by a coupled command transfer unit.

FIG. 23 is a flow chart for explaining a reception process for receiving the write complete notification by the coupled command transfer unit. In step S60 illustrated in FIG. 23, the coupled command transfer unit 40 waits until the write complete notification WC1 indicating that the data DAa read from the buffer unit 37 is written to the memory 14 is input to the coupled command transfer unit 40. When the coupled command transfer unit 40 receives the write complete notification WC1 and the judgment result in step S60 becomes YES, the coupled command transfer unit 40, in step S61, transmits the write complete notification WC2 to the response queue 33. More particularly, the transaction number NTe retained in the response queue 42 indicated by the pointer "0" is notified, as the write complete notification WC2, to the response queue 33. After the process of step S61, the process returns to step S60 to receive the write complete notification WC1 from the memory I/F 29.

Figure 24:
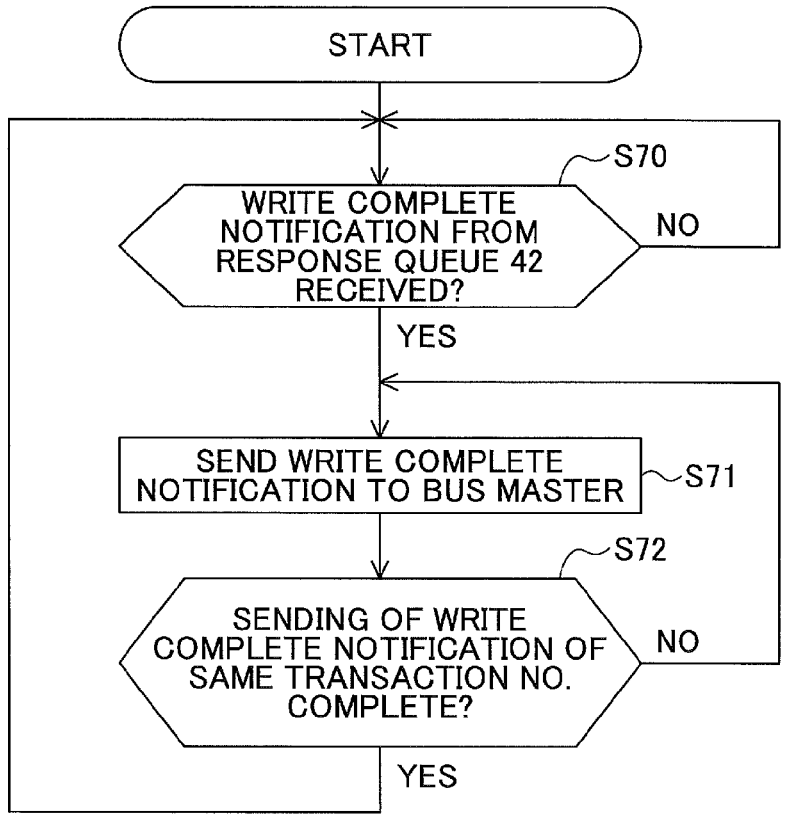
FIG. 24 is a flow chart for explaining a transmission process for transmitting the write complete notification with respect to a bus master.
Figure 25:
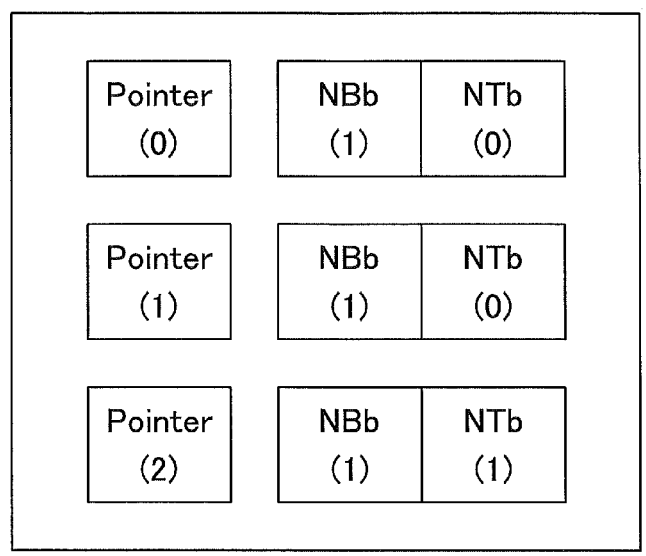
FIG. 25 is a diagram for explaining the transmission process for transmitting the write complete notification with respect to the bus master.

FIG. 24 is a flow chart for explaining a transmission process for transmitting the write complete notification with respect to the bus master. In step S70 illustrated in FIG. 24, the response queue 33 waits until the write complete notification WC2 (the transaction number NTe in this example) is received from the response queue 42. When the response queue 33 receives the transaction number NTe and the judgment result in step S70 becomes YES, the response queue 33, in step S71, transmits the write complete notification WC3 with respect to the bus master at the transfer source of the command transfer request CR having the transaction number NTb that is the same as the transaction number NTe ("0" in this example). This write complete notification WC3 continues until the transmission with respect to all response requests having the same transaction number NTe are completed. In this example, the transaction number NTb of the response queue 33 indicated by the pointer "0" is "0", as illustrated in FIG. 25, and for this reason, the write complete notification WC3 is transmitted with respect to the bus master having the bus master number NB that is "1". Thereafter, because the transaction number NTb of the response queue 33 indicated by the pointer "1" is also "0", the write complete notification WC3 is transmitted with respect to the bus master having the bus master number NB that is "1". Next, because the transaction number NTb of the response queue 33 indicated by the pointer "2" is "1", the judgment result in step S72 becomes YES, and the process returns to step S70. In step S72, the response queue 33 judges whether the transmission of the write complete notification having the same transaction number is completed.

Next, as illustrated in FIG. 20, when the flag F2 of the line buffer Lc at the line number NL that is "1" becomes "1" and the judgment result in step S41 becomes NO, the coupled command transfer unit 40, in step S45, generates the address ADd after the coupling and the size Sd after the coupled, based on the address ADc and the size Sc of the line number NL that is "1". More particularly, when the flag F2 is "1" (F2=1), it indicates that the data coupling is interrupted at a size amounting to less than 1 line of the buffer unit 37. Hence, the coupled command transfer unit 40 generates the size Sd after the coupling (32 bytes in this example) by adding the size Sc (32 bytes in this example) to the address ADc[7:0] ("0x00" in this example) of the line number NL that is "1". In addition, the coupled command transfer unit 40 retains the address ADc ("0x00000100" in this example) in the address ADd after the coupling, and thereafter set the lower 8 bits of the address ADd to "0", in order to generate the address ADd after the coupling ("0x00000100" in this example). Accordingly, the command transfer request after the coupling, having the address ("0x00000100" in this example) with the alignment unit of the arbitrary burst length and the data size (32 bytes in this example) smaller than the arbitrary burst length (256 bytes in this example), is generated.

Next, in step S43, the coupled command transfer unit 40 retains, in the command queue 41 indicated by the pointer "1", the bus master number NBd that is "1", the address ADd after the coupling that is "0x00000100", the size Sd after the coupling that is "32 bytes", and the transaction number NTd that is "1". Hence, the command transfer request CRa after the coupling, corresponding to the data stored in the line buffer Lfg at the line number "1", is retained within the command queue 41 indicated by the pointer "1".

Next, the coupled command transfer unit 40, in step S44, issues the command transfer request CRa after the coupling, having the address ADd after the coupling ("0x00000100" in this example) and the size Sd after the coupling (32 bytes in this example) that are retained in the command queue 41 indicated by the pointer "1", with respect to the memory I/F 29. Thereafter, the processes of steps S50 through S54 illustrated in FIG. 21, steps S60 and S61 illustrated in FIG. 23, and steps S70 through S72 are successively carried out.

Next, a description will be given of the operation of the data coupling unit 30, by referring to a second example illustrated in FIGS. 26A through 26F. FIGS. 26A, 26B, 26C, 26D, 26E, and 26F are diagrams for explaining the operation of the second example.

In this second example, as illustrated in FIG. 26A, the data coupling unit 30 first receives the data DATA1 having a start address "0x00000020" and a size of 64 bytes from a predetermined bus master via the write arbitration unit 28A. Then, the data coupling unit 30 receives the data DATA2 having a start address "0x00000060" and a size of 128 bytes from the same bus master. Thereafter, the data coupling unit 30 receives the data DATA3 having a start address "0x000000E0" and a size of 32 bytes from the same bus master. After receiving the data DATA1 through DATA3, the transfer request from the bus master ends.

A description will be given of the process of receiving the command transfer requests CR corresponding to the data DATA1 through DATA3. However, the process of receiving the command transfer requests CR corresponding to the data DATA1 and DATA2 is the same as that of the first example described above, and thus, a description thereof will be omitted. A description will be given of the process of receiving the command transfer request CR corresponding to the data DATA3.

As illustrated in FIG. 26B, when the command transfer request CR is received, the bus master number that is the same as the bus master number NB ("1" in this example) from the write arbitration unit 28A is stored in the retaining unit 35, and thus, the line number ("0" in this example) of the retaining unit 35 retaining the most recent transaction number NT ("0" in this example) is selected. Next, the address value (=0x000000E0) is computed by adding the size Sc (=128 bytes) to the address ADc (=0x00000060) retained in the line buffer Lc at the line number NL that is "0". The following process is carried out in this example, since the computed address value matches the address ADf ("0x000000E0" in this example) is output from the write arbitration unit 28A. In other words, the command transfer unit 31 retains "1", "0xE0", "32 bytes", "0", and "0" in the bus master number NBa, the address ADa, the size Sa, the line number NLc, the judgment result H1, and the transaction number NTa indicated by the write pointer WP ("2" in this example), respectively. In addition, the buffer management unit 34 updates the address ADc and the size Sc in the line buffer Lc at the line number NL that is "0", to "0x000000E0" that is the same as the address AD and "32 bytes" that is the same as the size Si, respectively.

Next, the added value (=256 bytes) is computed by adding the size Sa (32 bytes in this example) to the address ADa ("0xE0" in this example) indicated by the write pointer WP. In this case, when the added value is equal to 256 bytes, the command transfer unit 31 sets the judgment result H2 indicated by the write pointer WP to "0b10".

A description will be given of the process of receiving the data transfer request DR corresponding to the data DATA1 through DATA3. The process of receiving the data transfer request DR corresponding to the data DATA1 and DATA2 is the same as that of the first example described above. In other words, as illustrated in FIGS. 26B and 26C, the 64-byte data DATA1 is written in the data retaining unit 38 and the data enable retaining unit 39 from the address "0x20" at the line number "0", and the 128-byte data DATA2 is written in the data retaining unit 38 and the data enable retaining unit 39 from the subsequent address "0x60".

Next, as illustrated in FIGS. 26D and 26E, when the command transfer unit 31 receives the data transfer request DR corresponding to the data DATA3, the 32-byte data DATA3 is written in the buffer unit 37 using, as the start address, the line number NLc ("0" in this example) indicated by the read pointer RP ("2" in this example) and the address ADa ("0xE0" in this example).

Then, when the last cycle of the data transfer to the buffer unit 37 is reached, the command reception wait signal is set to "1". Next, the address ADa ("0xE0" in this example) indicated by the read pointer RP ("2" in this example) and the address ADc[7:0] ("0xE0" in this example) retained in the line buffer Lc at the line number NL that is "0" are compared. In this case, the address ADa and the address ADc match, and furthermore, the judgment result H2 indicated by the read pointer RP is "0b10". Hence, the command transfer unit 31, in step S34, sets the flag F1 of the retaining unit 35 to "1". In addition, in step S34, the command transfer unit 31 moves the bus master number NBa ("1" in this example) and the transaction number NTa ("0" in this example) indicated by the read pointer RP to the response queue 33. Furthermore, because the judgment result H2 is "0b10" and the command transfer requests CR of the subsequent consecutive addressers do not exist within the command queue 32, the flag F2 of the retaining unit 35 at the line number NL that is "0" is set to "1".

Next, because the flag F1 in the line buffer Lc at the line number NL that is "0" is "1", the coupled command transfer unit 40 generates the address ADd after the coupling ("0x00000000" in this example) by retaining the address ADc ("0x000000E0" in this example) of the line number NL that is "0" with respect to the address ADd after the coupling, and thereafter making the lower 8 bits of the address ADd after the coupling "0". Then, as illustrated in FIG. 26F, the coupled command transfer unit 40 retains, in the command queue 41, the address ADd after the coupling and the size Sd after the coupling, which are computed in the manner described above, and the bus master number NBc ("1" in this example) and the transaction number NTc ("0" in this example) retained in the line buffer Lc at the line number NL that is "0". As a result, the command transfer request CRa having the data size of the arbitrary burst length (256 bytes in this example) and the start address with the alignment unit of the arbitrary burst length is retained in the command queue 41.

Next, the coupled command transfer unit 40 issues the command transfer request CRa after the coupling, having the address ADd after the coupling ("0x00000000" in this example) and the size Sd after the coupling (256 bytes in this example) that are retained in the command queue 41, with respect to the memory I/F 29. The data DAa and the data enable ENa after the coupling, retained in the buffer unit 37 (the data retaining unit 38 and the data enable retaining unit 39) at the line number "0", are transferred to the memory 14 via the memory I/F 29.

Next, a description will be given of the operation of the data coupling unit 30, by referring to a third example illustrated in FIGS. 27A through 27F. FIGS. 27A, 27B, 27C, 27D, 27E, and 27F are diagrams for explaining the operation of the third example. FIGS. 27A, 27B, 27C, 27D, 27E, and 27F respectively illustrate the transfer data, the state of the data retaining unit 38, the state of the data enable retaining unit 39, the command transfer, the data transfer, and the generation of the coupled data, similarly to FIGS. 26A, 26B, 26C, 26D, 26E, and 26F described above.

In this third example, as illustrated in FIG. 27A, the data coupling unit 30 receives the data DATA1 having a start address "0x00000020" and a size of 64 bytes from a predetermined bus master via the write arbitration unit 28A. After receiving the data DATA1, the transfer request from the same bus master ends.

As illustrated in FIG. 27D, when the command transfer unit 31 receives the command transfer request CR, the bus master number that is the same as the bus master number NB ("1" in this example) from the write arbitration unit 29A is not stored in the retaining unit 35, and thus, the command transfer unit 31 carries out the process of step S4 illustrated in FIG. 10. More particularly, the command transfer unit 31 acquires the vacant line number ("0" in this example) of the buffer unit 37. The command transfer unit 31 retains in the bus master number NBa, the address ADa, and the size Sa of the command queue 32 indicated by the write pointer WP ("0" in this example) the bus master number NB that is "1", the address AD[7:0] that is "0x20", and the size Si that is "64 bytes", respectively. The command transfer unit 31 retains in the line number NLc, the judgment result H1, and the transaction number NTa indicated by the write pointer WP ("0" in this example) the vacant line number that is "0", "0", and "0" assigned by the number assigning unit 36, respectively. In addition, the buffer management unit 34 retains in the address ADc and the size Sc of the line buffer Lc at the line number NL that is the same as the vacant line number "0" the address AD that is "0x00000020" and the size Si that is "64 bytes", respectively.

Next, an added value (=96 bytes) is computed by adding the size Sa (64 bytes in this example) to the address ADa ("0x20" in this example) indicated by the write pointer WP. In this case, the added value becomes smaller than 256 bytes, and the command transfer unit 31 sets the judgment result H2 indicated by the write pointer WP to "0b00".

Next, as illustrated in FIG. 27E, when the command transfer unit 31 receives the data transfer request DR corresponding to the data DATA1, the 64-byte data DATA1 is written into the buffer unit 37 using the line number NLc ("0" in this example) and the address ADa ("0x20" in this example) indicated by the read pointer RP ("0" in this example) as the start address. In other words, as illustrated in FIGS. 27B and 27C, the 64-byte data DATA1 is written into the data retaining unit 38 and the data enable retaining unit 39 from the address "0x20" at the line number "0".

Next, when the last cycle of the data transfer to the buffer unit 37 is reached, the command reception wait signal is set to "1". Then, as illustrated in FIG. 27E, the address ADa ("0x20" in this example) indicated by the read pointer RP ("0" in this example) and the address ADc[7:0] ("0xE0" in this example) retained in the line buffer Lc at the line number NL that is "0" are compared. In this case, the address ADa and the address ADc match, and furthermore, the judgment result H2 indicated by the read pointer RP is "0b00". For this reason, the command transfer requests CR of the subsequent consecutive addresses do not exist within the command queue 32. Hence, the command transfer unit 31, in step S37 illustrated in FIG. 15, sets the flag F2 of the retaining unit 35 at the line number NL that is "0" to "1". In addition, in step S37, the command transfer unit 31 moves the bus master number NBa ("1" in this example) and the transaction number NTa ("0" in this example) indicated by the read pointer RP to the response queue 33.

Next, because the flag F2 in the line buffer Lc at the line number NL that is "0" is "1", the coupled command transfer unit 40 generates the address ADd after the coupling and the size Sd after the coupling, based on the address ADc and the size Sc retained in the line buffer Lc. More particularly, the coupled command transfer unit 40 generates the size Sd after the coupling (96 bytes in this example) by adding the size Sc (65 bytes in this example) to the address ADc[7:0] ("0x20" in this example) at the line number NL that is "0". In addition, the coupled command transfer unit 40 generates the address ADd after the coupling ("0x00000000" in this example), by retaining the address ADc ("0x00000020" in this example) of the line number NL that is "0" with respect to the address ADd after the coupling, and thereafter making the lower 8 bits of the address ADd after the coupling "0". Then, as illustrated in FIG. 27F, the coupled command transfer unit 40 retains, in the command queue 41, the address ADd after the coupling and the size Sd after the coupling that are computed in the manner described above, and the bus master number NBc ("1" in this example) and the transaction number NTc ("0" in this example) that are retained in the retaining unit 35 at the line number NL that is "0". Accordingly, the command transfer request CRa having the data size (96 bytes in this example) smaller than the arbitrary burst length and the start address ("0x00000000" in this example) with the alignment unit of the arbitrary burst length is retained in the command queue 41.

Next, the coupled command transfer unit 40 issues the command transfer request CRa having the address ADd after the coupling ("0x00000000" in this example) and the size Sd after the coupling (96 bytes in this example) that are retained in the command queue 41, with respect to the memory I/F 29. Hence, the data DAa and the data enable ENa after the coupling, retained in the buffer unit 37 (the data retaining unit 38 and the data enable retaining unit 39) at the line number "0", are transferred to the memory 14 via the memory I/F 29.

By the operation of the data coupling unit 30 described above, a plurality of command transfer requests CR having a short burst length are coupled to generate the command transfer request CRa having the long burst length (equal to or shorter than the arbitrary burst length) and the start address with the alignment unit of the arbitrary burst length. In other words, in the case in which the arbitrary burst length is 256 bytes, the command transfer request CRa having the start address in which the lower 8 bits of the address are "0x00" is generated. Hence, it is possible to improve the utilization efficiency of the memory 14, as will be described hereinafter in more detail.

Figure 28A:
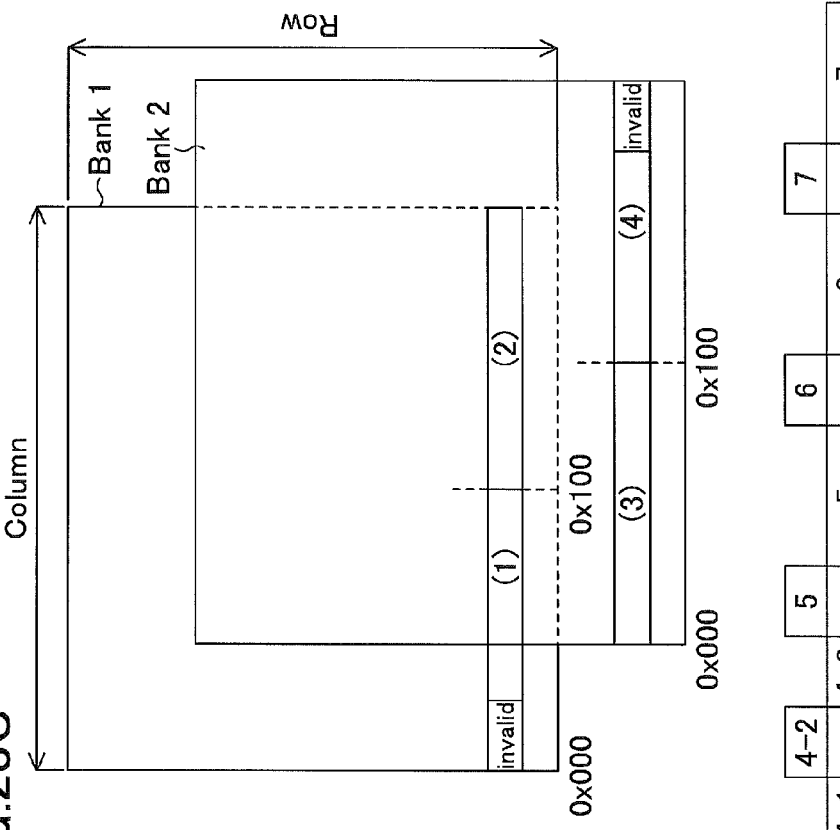
FIGS. 28A and 28B are diagrams for explaining a conventional data transfer.
Figure 28B:
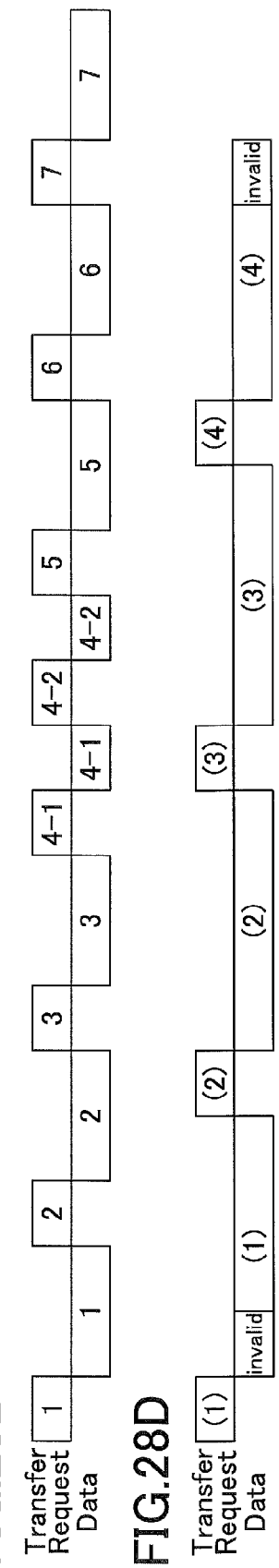
Figure 28C:
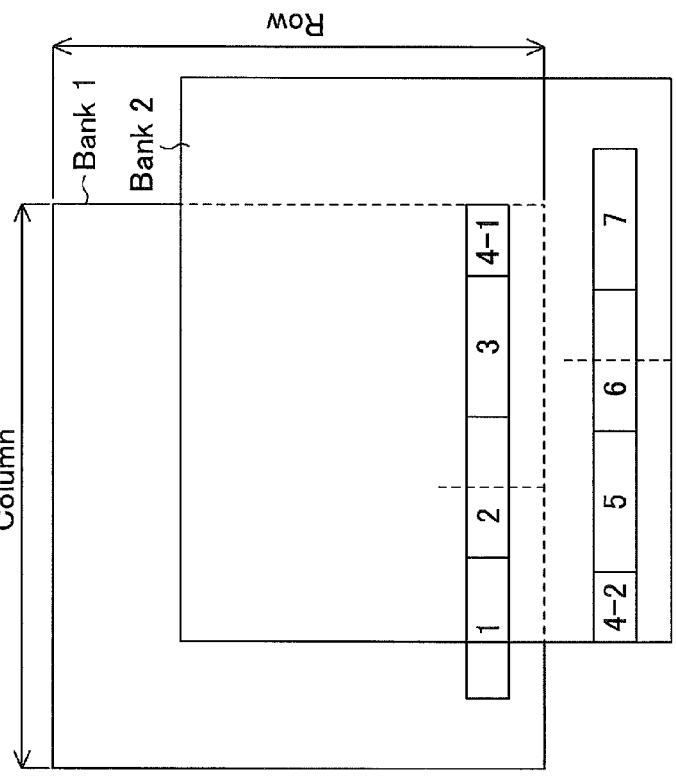
FIGS. 28C and 28D are diagrams for explaining a data transfer in one embodiment.
Figure 28D:
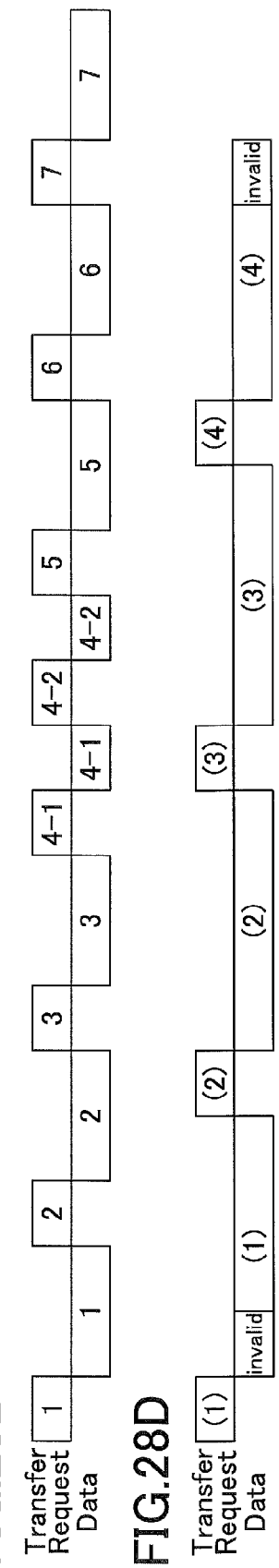

FIGS. 28A and 28B are diagrams for explaining a conventional data transfer, and FIGS. 28C and 28D are diagrams for explaining a data transfer in one embodiment.

First, a description will be given of a case in which data "1" through "7" are transferred by the conventional data transfer, as illustrated in FIG. 28A.

According to the conventional data transfer, one transfer request is issued even in a case in which the transfer data having the short burst length (that is, having a small data size) is to be transferred. For this reason, as illustrated in FIG. 28B, the transfer request is issued with respect to each of the data "1" through "7" having the short burst length. Further, because the address AD of the command transfer request CR output from the bus master specifies an arbitrary address in the memory 14, one burst access may easily span a plurality of banks or a plurality of row addresses. For example, in the example illustrated in FIG. 28A, the burst access for transferring the data "4" spans 2 banks 1 and 2. In other words, a partial data "4-1" of the data "4" is written in the bank 1, and a remaining partial data "4-2" of the data "4" is written in the bank 2 that is separate from the bank 1. In this case, as illustrated in FIG. 28B, the transfer request is issued with respect to the partial data "4-1", and in addition, the partial request is also issued with respect to the partial data "4-2". Therefore, according to the conventional data transfer, a large number of transfer requests (or commands) are issued, to thereby increase a load on the memory band of the memory 14.

On the other hand, according to the data transfer in one embodiment, parts of the data "1" and the data "2" are coupled to generate a data "(1)", and the command transfer requests CR corresponding to the data "1" and the data "2" are coupled, in order to generate a command transfer request "(1)" having a data size of an arbitrary burst length and a start address with an alignment unit of the arbitrary burst length, as illustrated in FIGS. 28C and 28D. In other words, an address corresponding to the column address of the memory 14 becomes "0x000". Next, the remaining part of the data "2", the data "3", and the data "4-1" are coupled to generate a data "(2)", and the command transfer requests CR corresponding to the 3 data "2", "3", and "4-1" are coupled, in order to generate a command transfer request "(2)" having the data size of the arbitrary burst length. In the start address of this command transfer request "(2)", lower 9 bits of the address become "0x100". Then, the data "4-2", the data "5", and a part of the data "6" are coupled to generate a data "(3)", and the command transfer requests CR corresponding to the 3 data "4-2", "5", and "6" are coupled, in order to generate a command transfer request "(3)" having the data size of the arbitrary burst length. In the start address of this command transfer request "(3)", lower 9 bits of the address become "0x000". Further, a remaining part of the data "6" and the data "7" are coupled to generate a data "(4)", and the command transfer requests CR corresponding to the 2 data "6" and "7" are coupled, in order to generate a command transfer request "(4)" having the data size smaller than the arbitrary burst length. In the start address of this command transfer request "(4)", lower 9 bits of the address become "0x100".

By the operation described above, the data transfer in one embodiment can couple and convert the command transfer requests CR having the short burst lengths into the command transfer request having the long burst length, and thus, the issuance of the command transfer requests can be reduced as illustrated in FIG. 28D. On the other hand, merely coupling the plurality of command transfer requests CR may cause one burst access to span a plurality of banks or a plurality of row addresses, since the addresses AD of the command transfer requests CR before the coupling may specify arbitrary addresses in the memory 14. However, according to the data transfer in one embodiment, the command transfer request CRa after the coupling, generated as described above, has the data size of the arbitrary burst length or less, and has the start address with the alignment unit of the arbitrary burst length. For this reason, even in a case in which the addresses AD of the command transfer requests CR before the coupling specify arbitrary addresses in the memory 14, it is possible to positively prevent one burst access from spanning a plurality of banks or a plurality of row addresses, and thus, the issuance of the command transfer requests can be reduced also from this viewpoint. For example, in the case in which 8 issuances of the command transfer requests are required in the conventional data transfer illustrated in FIG. 28B, the example illustrated in FIGS. 28C and 28D can reduce the issuances of the command transfer requests to 4 according to the data transfer in one embodiment. Therefore, it is possible to improve the utilization efficiency of the memory band of the memory 13.

According to the embodiment and examples described above, the following advantageous effects or features can be obtained.

(1) The plurality of command transfer requests CR are coupled, in order to generate the command transfer request having the data size of the arbitrary burst length or less and the start address with the alignment unit of the arbitrary burst length. Accordingly, the utilization efficiency of the memory band of the memory 14 can be improved.

(2) In the write arbitration unit 28A, the bus master having the high priority order is selected. For this reason, a large number of command transfer requests from the bus masters having high priorities are retained in the command queue 32.

Hence, the command transfer requests from the bus masters having higher priorities are coupled more frequently, and it is possible to particularly improve the utilization efficiency of the memory band of the memory 14 when the bus masters having the higher priorities make access to the memory 14.

(3) The buffer unit 37 for temporarily retaining the data DA and the data enable EN output from the bust master, is provided between the write arbitration unit 28A and the memory I/F 29. Accordingly, one buffer unit 37 may be shared by a plurality of bus masters. For this reason, compared to a case in which the data DA and the data enable EN are temporarily retained in the buffer part that is provided for every bus master, it is possible to suppress an increase in a circuit scale of the image processing apparatus 12.

(4) The transaction number NT specifying the command transfer request CRa after the coupling is retained in correspondence with the command transfer request CR before the coupling. Accordingly, it is possible to positively transmit the write complete notification WC3 corresponding to the command transfer request CR before the coupling to the bus master, based on the write complete notification WC1 with respect to the command transfer request CRa after the coupling.

(5) Each information in the command queues 32 and 41, the response queues 33 and 42, and the retaining unit 35 are retained in correspondence with the bus master number NB. Hence, even in a case in which a plurality of bus masters are activated, the process with respect to each of a plurality of transfer requests from the plurality of bus masters can be carried out in the state in which the plurality of transfer requests from the plurality of bus masters coexist simultaneously.

(6) In a case in which a command transfer bus on which the command transfer request CR is issued and a data transfer bus on which the data DA or the like are transferred are separate buses, the data transfer is completed in 1 to 32 burst cycles, while the transfer of the transfer request is basically completed in 1 burst cycle. The number of burst cycles in this case refers to the number of burst cycles for the case in which the bus width is 8 bytes and the data size of the data transfer is 8 bytes to 256 bytes. For this reason, in the case of the data transfer of 64 bytes, for example, even when the accumulation of the command transfer request CR to the command queue 32 is interrupted (step S25) in the last burst cycle (refer to step S24) of this data transfer, a maximum of 7 command transfer requests CR input during the burst cycles other than the last burst cycle are accumulated in the command queue 32. Accordingly, even when the accumulation of the command transfer request CR to the command queue 32 is interrupted, it is possible to suppress interruption of the coupling process caused by only a small number of command transfer requests CR being accumulated in the command queue 32.

The embodiment described above may be appropriately modified, as described hereinafter in conjunction with second and third embodiments.

[Second Embodiment]

Figure 29:
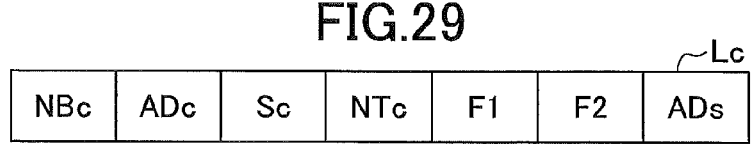
FIG. 29 is a diagram for explaining a line buffer of the retaining unit in a second embodiment.

FIG. 29 is a diagram for explaining a line buffer of the retaining unit in a second embodiment. As illustrated in FIG. 29, a coupling start address ADs may be retained in each line buffer Lc of the retaining unit 35, together with the address ADc, the flags F1 and F2, or the like. This coupling start address ADs is the lower 8 bits of the address AD corresponding to the first command transfer request CR amongst the plurality of command transfer requests CR to be coupled. For example, in the example illustrated in FIGS. 9A through 9C, amongst the 3 command transfer requests CR corresponding to the data DATA1 through DATA3, the lower 8 bits ("0x20" in this example) of the address AD ("0x00000020" in this example) of the first command transfer request CR corresponding to the data DATA1 is retained in the line buffer Lc as the coupling start address ADs. In a case in which the line number NLn is acquired by the judgment result H2=0b11, "0x00" is retained in the line buffer Lc as the coupling start address ADs.

In this embodiment, the method of computing the address ADd after the coupling and the size Sd after the coupling in steps S42 and S45 illustrated in FIG. 19 may be modified in the following manner. That is, in a case in which the flag F1 is F1=1 in step S42, the size Sd after the coupling may be computed by subtracting the coupling start address ADs from the arbitrary burst length (256 bytes). In addition, the address ADd after the coupling may be computed by retaining the coupling start address ADs in the lower 8 bits of the address ADd after the coupling, and further retaining the upper 24 bits of the address ADc in the upper 24 bits of the address ADd after the coupling. For example, in the example illustrated in FIG. 20, the size Sd after the coupling at the line number NL that is "0" becomes 224 (=256-32) bytes because the coupling start address ADs becomes "0x20 (32)". In addition, the address ADd after the coupling at the line number NL that is "0" becomes "0x00000020", based on the coupling start address ADs ("0x20" in this example) and the address ADc ("0x000000E0" in this example) retained in the line buffer Lc.

On the other hand, in a case in which the flag F1 is F1=0 and the flag F2 is F2=1 in step S45 illustrated in FIG. 19, the size Sd after the coupling may be computed from the following formula.

$Sd=$(address $ADc[7:0]$)+(size $Sx[7:0]$)−(coupling start address $ADs$)

In addition, the address ADd after the coupling may be computed by retaining the coupling start address ADs in the lower 8 bits of the address ADd after the coupling, and further retaining the upper 24 bits of the address ADc in the upper 24 bits of the address ADd after the coupling. For example, in the example illustrated in FIG. 20, the size Sd after the coupling at the line number NL that is "1" becomes "32 bytes", because the address ADc[7:0], the size Sc[7:0], and the coupling start address ADs at the line number NL that is "1" become "0x00", "32 bytes", and "0x00", respectively. Further, the address ADd after the coupling at the line number NL that is "1" becomes "0x00000000", based on the coupling start address ADs ("0x00" in this example) and the address ADc ("0x00000100" in this example) retained in the line buffer Lc.

In other words, according to this embodiment, the start address of the command transfer request CRa after the coupling, generated in the first embodiment described above, is converted into an address based on the coupling start address ADs.

According to this embodiment, no transfer of redundant data, which is not a valid data output from the bus master, occurs. For example, the redundant data may be the "initial value" retained at the address [7:0], such as "0x00" through "0x1F", of the data retaining unit 38 illustrated in FIGS. 9A through 9C. Hence, redundant data transfer can be reduced, to thereby further improve the utilization efficiency of the memory band of the memory 14.

Third Embodiment

Figure 30:
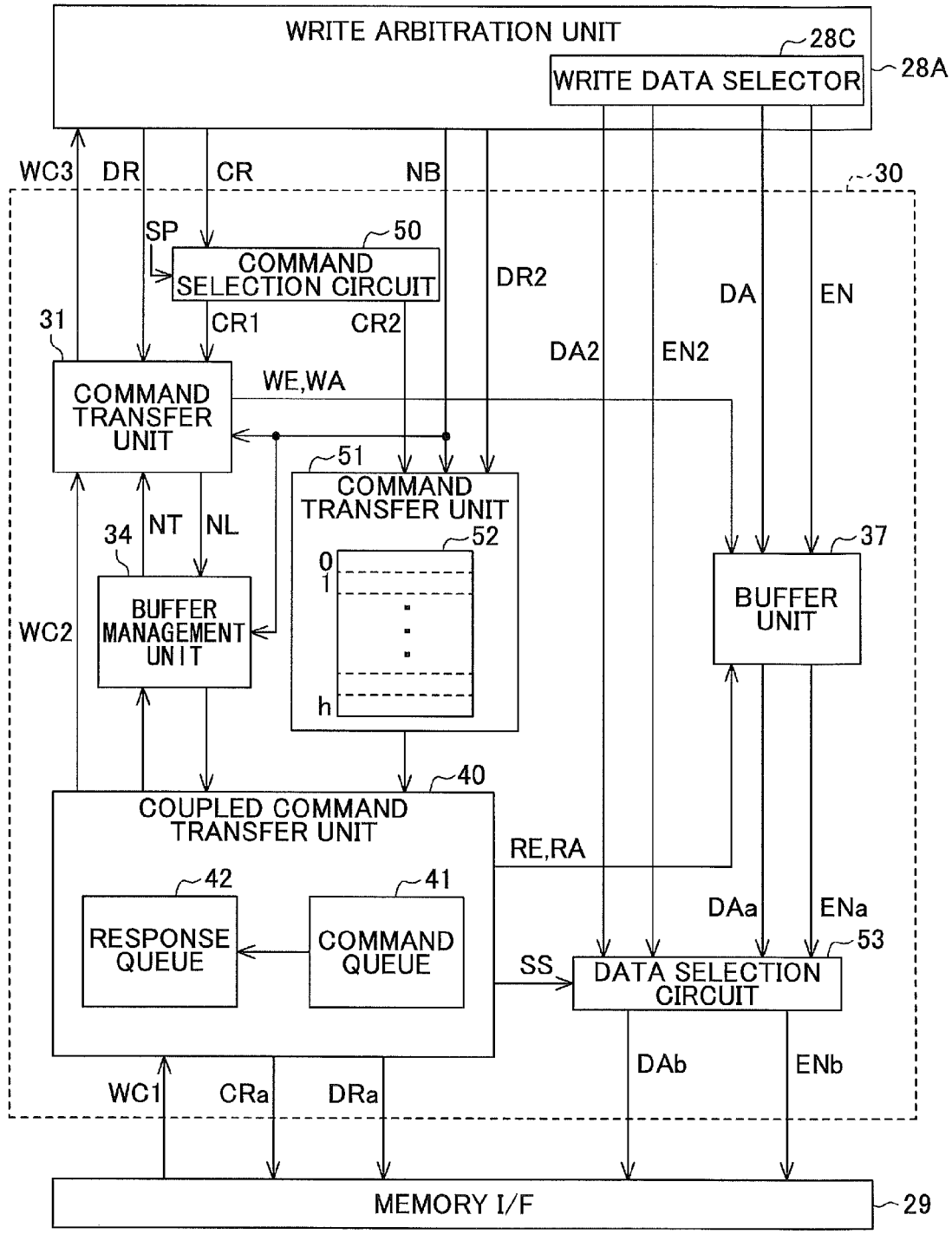
FIG. 30 is a block diagram illustrating an example of an internal configuration of a data coupling unit in a third embodiment.

FIG. 30 is a block diagram illustrating an example of an internal configuration of a data coupling unit in a third embodiment. As illustrated in FIG. 30, a command selection circuit 50, a command transfer unit 51, and a data selection circuit 53 may be provided in addition to the data coupling unit 30 illustrated in FIG. 3. The command transfer request CR from the write arbitration unit 28A, and a coupling enable (or disable) signal SP that is provided for every bus master are input to the command selection circuit 50. The coupling enable signal SP indicates whether the coupling of the command transfer requests CR (or coupling of the data) is possible. The command selection circuit 50 outputs the received command transfer request CR to the command transfer unit 31, as a command transfer request CR1, in a case in which the coupling enable signal SP indicates that the coupling of the command transfer requests CR is possible. The command transfer request CR1 that is output to the command transfer unit 31 may be processed in a manner similar to the processing carried out in the first embodiment described above. The bus master capable of coupling the command transfer requests CR may include the sensor I/F 21, the color processing unit 22, or the like illustrated in FIG. 2, for example. On the other hand, the command selection circuit 50 outputs the received command transfer request CR to the command transfer unit 51 that is provided in a separate path that does not include the command transfer unit 31, as a command transfer request CR2, in a case in which the coupling enable signal SP indicates that the coupling of the command transfer requests CR is not possible. In other words, the command selection circuit 50 distributes the command transfer request CR to the command transfer units 31 and 51, based on the coupling enable signal SP.

The command transfer unit 51 includes a command queue 52 for successively accumulating the command transfer request CR. The command queue 52 includes a plurality of (h+1 in this example) lines. Transfer information (the bus master number NB of the transfer request source, or the like), and the data transfer request DR2 are input to the command transfer unit 51. The command transfer unit 51 outputs the command transfer request CR2 retained in the command queue 52 to the coupled command transfer unit 40, based on the bus master number NB and the data transfer request DR2. The coupled command transfer unit 40 selectively retains in the command queue 41 the command transfer request CRa after the coupling, generated based on the information retained in the buffer management unit 34, and the command transfer request CR2 from the command transfer unit 51.

A write data selector 28C provided within the write arbitration unit 28A outputs the data DA and the data enable EN corresponding to the command transfer request CR1 to the buffer unit 37. The data DA and the data enable EN are coupled within the buffer unit 37, in a manner similar to the first embodiment described above. The data DAa and the data enable ENa after the coupling are output from the buffer unit 37 to the data selection circuit 53. On the other hand, the write data selector 28C outputs the data DA2 and the data enable EN2 corresponding to the command transfer request CR2 to the data selection circuit 53 directly, and not via the buffer unit 37.

The coupled command transfer unit 40 generates a selection signal SS based on states of the buffer management unit 34 and the command queue 52, and outputs the selection signal SS to the data selection circuit 53. The data selection circuit 53 selects either the data DAa and the data enable ENa after the coupling, or the data DA2 and the data enable EN2, and output the selected data and data enable to the memory I/F 29, as a data DAb and a data enable ENb.

According to this embodiment, it is possible to transfer the non-coupled data DA2 and data enable EN2 to the memory 14 via the memory I/F 29, during a time interval in which the data DA after the coupling or the like is not yet generated, for example, in parallel with the data transfer to the buffer unit 37 by the command transfer unit 31.

In this embodiment, the command transfer unit 31 is an example of a first command transfer unit, the command transfer unit 51 is an example of a second command transfer unit, and the command queue 52 is an example of a third command queue.

In the embodiments described above, the number of lines of the command queues 32 and 41, the response queues 33 and 42, the retaining unit 35, and the buffer unit 37 (the data retaining unit 38 and the data enable retaining unit 39) is not limited to a particular number. The number of lines of the command queues 32 and 41, the response queues 33 and 42, the retaining unit 35, and the buffer unit 37 (the data retaining unit 38 and the data enable retaining unit 39) is preferably set to an optimized number that is obtained in advance by a simulation or the like.

According to the embodiments and examples described above, it is possible to improve the memory band utilization efficiency.

The description above use terms such as "determine", "identify", or the like to describe the embodiments, however, such terms are abstractions of the actual operations that are carried out. Hence, the actual operations that correspond to such terms may vary depending on the implementation, as is obvious to those skilled in the art.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data transfer apparatus which transfers data input from a processing unit to a memory, comprising:
   a command transfer unit including a first command queue that retains a plurality of transfer requests input from the processing unit, a first judgment result indicating whether a plurality of data corresponding to the plurality of transfer requests input from the processing unit are continuous data, and a second judgment result indicating whether a size after coupling the plurality of data exceeds a first burst length less than or equal to a column size of the memory, and configured to output a write address based on the first judgment result and the second judgment result;
   a buffer unit including a plurality of first line buffers, respectively having a size greater than or equal to the first burst length and configured to retain the data input from the processing unit in the plurality of first line buffers according to the write address;

a buffer management unit including a retaining unit that includes a number of second line buffers equal to a number of the plurality of first line buffers and retains coupling information for coupling the transfer requests corresponding to the data retained in each of the plurality of first line buffers; and a coupled command transfer unit configured to generate a transfer request after coupling, having a data size less than or equal to the first burst length and a start address based on the first burst length, by coupling the plurality of transfer requests based on the coupling information retained in the retaining unit, and to output the transfer request after the coupling, wherein the buffer management unit manages a first number indicating the transfer request after the coupling, and retains the first number in the second line buffer, the command transfer unit retains, together with the transfer request, a line number of the first line buffer to which the data corresponding to the transfer request is to be written, the first judgment result, the second judgment result, and the first number in the first command queue, and includes a first response queue that retains the first number retained in the first command queue, the coupled command transfer unit includes a second command queue that retains the first number together with the transfer request after the coupling, and a second response queue that retains the first number retained in the second command queue, and is configured to output the first number retained in the second response queue to the command transfer unit when a write complete notification with respect to the transfer request after the coupling is received, and the command transfer unit outputs the write complete notification to the processing unit at a transfer request source, based on the first number received from the coupled command transfer unit and the first number retained in the first response queue.

2. The data transfer apparatus as claimed in claim 1, wherein the command transfer unit carries out a process including generating a first flag indicating whether coupling of the data amounting to 1 line of the first line buffer is completed in each of the plurality of first line buffers, based on the second judgment result, and retaining the first flag in the retaining unit, and generating a second flag indicating whether the coupling of the data is interrupted upon coupling less than 1 line of the first line buffer in each of the plurality of first line buffers, based on the first judgment result and the second judgment result, and retaining the second flag in the retaining unit.

3. The data transfer apparatus as claimed in claim 2, wherein each of the second line buffers retains a transfer request received last amongst the transfer requests corresponding to the data retained in one of the plurality of first line buffers, the first flag, and the second flag.

4. The data transfer apparatus as claimed in claim 1, further comprising:

a write arbitration unit configured to arbitrate the transfer requests output from a plurality of processing units, wherein the first command queue, the first response queue, the retaining unit, the second command queue, and the second response queue retain, together with the first number, a second number indicating the processing unit at the transfer request source.

5. The data transfer apparatus as claimed in claim 1, wherein the first burst length is set to a size corresponding to a divisor of the column size of the memory.

6. The data transfer apparatus as claimed in claim 1, further comprising:

a command selection circuit configured to output the transfer request input from the processing unit to one of the command transfer unit and another command transfer unit, based on a coupling decision signal indicating whether coupling of the transfer requests is possible;

the other command transfer unit including a third command queue that retains the transfer request input from the command section circuit, and configured to output the transfer request retained in the third command queue to the coupled command transfer unit; and a data selection circuit configured to output one of the data after the coupling retained in the buffer unit, and non-coupled data corresponding to the transfer request output to the other command transfer unit, based on a selection signal that is generated based on states of the buffer management unit and the third command queue.

7. A data transfer apparatus, which transfers data input from a processing unit to a memory, comprising:

a command transfer unit including a command queue that retains a plurality of transfer requests input from the processing unit, a first judgment result indicating whether a plurality of data corresponding to the plurality of transfer requests input from the processing unit are continuous data, and a second judgment result indicating whether a size after coupling the plurality of data exceeds a first burst length less than or equal to a column size of the memory, and configured to output a write address based on the first judgment result and the second judgment result;

a buffer unit including a plurality of first line buffers, respectively having a size greater than or equal to the first burst length and configured to retain the data input from the processing unit in the plurality of first line buffers according to the write address;

a buffer management unit including a retaining unit that includes a number of second line buffers equal to a number of the plurality of first line buffers and retains coupling information for coupling the transfer requests corresponding to the data retained in each of the plurality of first line buffers; and a coupled command transfer unit configured to generate a transfer request after coupling, having a data size less than or equal to the first burst length and a start address based on the first burst length, by coupling the plurality of transfer requests based on the coupling information retained in the retaining unit, and to output the transfer request after the coupling, wherein the command transfer unit carries out a process including generating a first flag indicating whether coupling of the data amounting to 1 line of the first line buffer is completed in each of the plurality of first line buffers, based on the second judgment result, and retaining the first flag in the retaining unit, generating a second flag indicating whether the coupling of the data is interrupted upon coupling less than 1 line of the first line buffer in each of the plurality of first line buffers, based on the first judgment result and the second judgment result, and retaining the second flag in the retaining unit, generating the first judgment result depending on whether an address of the transfer request input from the processing unit matches an address of a transfer request from a processing unit at a transfer request source matching the processing unit from which the transfer request is input, amongst the plurality of transfer requests retained in the retaining unit, and generating the second judgment result depending on a comparison result of an added value and the first burst length, wherein the added value is obtained by adding an address in an address range amounting to 1 line of each of the plurality of first line buffers, amongst the addresses of the plurality of transfer requests input from the processing unit, and a size of the plurality of transfer requests input from the processing unit, and wherein each of the second line buffers retains a transfer request received last amongst the transfer requests corresponding to the data retained in one of the first line buffers, the first flag, and the second flag, and the coupled command transfer unit computes an address after the coupling and a size after the coupling, corresponding to the transfer request after the coupling, based on the address and the size of the transfer request, the first flag, and the second flag retained in the second line buffers.

8. A data transfer method comprising:

successively retaining a plurality of transfer requests input from a processing unit, and generating a write address based on a first judgment result indicating whether a plurality of data corresponding to the plurality of transfer requests input from the processing unit are continuous data, and a second judgment result indicating whether a size after coupling the plurality of data exceeds a first burst length less than or equal to a column size of a memory;

storing data input from the processing unit according to the write address, in a buffer unit including a plurality of first line buffers, respectively having a size greater than or equal to the first burst length;

generating, by a coupled command transfer unit, a transfer request after coupling, having a data size less than or equal to the first burst length and a start address based on the first burst length, by coupling the plurality of transfer requests corresponding to the data retained in each of the plurality of first line buffers, based on coupling information retained in a retaining unit that includes a number of second line buffers equal to a number of the plurality of first line buffers, and outputting the transfer request after the coupling;

managing, by a buffer management unit, a first number indicating the transfer Request after the coupling, and retains the first number in the second line buffer;

retaining, by a command transfer unit, together with the transfer request, a line number of the first line buffer to which the data corresponding to the transfer request is to be written, the first judgment result, the second judgment result, and the first number in a first command queue, and includes a first response queue that retains the first number retained in the first command queue;

retaining by a second command queue the first number together with the transfer request after the coupling, retaining by a second response queue the first number retained in the second command queue, and outputting the first number retained in the second response queue to the command transfer unit when a write complete notification with respect to the transfer request after the coupling is received; and outputting, by the command transfer unit, the write complete notification to the processing unit at a transfer request source, based on the first number received from the coupled command transfer unit and the first number retained in the first response queue.

9. The data transfer method as claimed in claim 8, further comprising:

generating a first flag indicating whether coupling of the data amounting to 1 line of the first line buffer is completed in each of the plurality of first line buffers, based on the second judgment result, and retaining the first flag in the retaining unit; and generating a second flag indicating whether the coupling of the data is interrupted upon coupling less than 1 line of the first line buffer in each of the plurality of first line buffers, based on the first judgment result and the second judgment result, and retaining the second flag in the retaining unit.

10. The data transfer method as claimed in claim 9, wherein each of the second line buffers retains a transfer request received last amongst the transfer requests corresponding to the data retained in one of the plurality of first line buffers, the first flag, and the second flag.

11. The data transfer method as claimed in claim 8, further comprising:

arbitrating, by a write arbitration unit, the transfer requests output from a plurality of processing units, wherein the first command queue, the first response queue, the retaining unit, the second command queue, and the second response queue retain, together with the first number, a second number indicating the processing unit at the transfer request source.

12. The data transfer method as claimed in claim 8, wherein the first burst length is set to a size corresponding to a divisor of the column size of the memory.

13. The data transfer method as claimed in claim 8, further comprising:

outputting, by a command selection circuit, the transfer request input from the processing unit to one of the command transfer unit and another command transfer unit, based on a coupling decision signal indicating whether coupling of the transfer requests is possible;

retaining, by a third command queue, the transfer request input from the command selection circuit, and outputting the transfer request retained in the third command queue to the coupled command transfer unit; and outputting, by a data selection circuit, one of the data after the coupling retained in the buffer unit, and non-coupled data corresponding to the transfer request output to the other command transfer unit, based on a selection signal that is generated based on states of the buffer management unit and the third command queue.

14. A data transfer method, comprising:

successively retaining a plurality of transfer requests input from a processing unit, and generating a write address based on a first judgment result indicating whether a plurality of data corresponding to the plurality of transfer requests input from the processing unit are continuous data, and a second judgment result indicating whether a size after coupling the plurality of data exceeds a first burst length less than or equal to a column size of a memory;

storing data input from the processing unit according to the write address, in a buffer unit including a plurality of first line buffers, respectively having a size greater than or equal to the first burst length;

generating a transfer request after coupling, having a data size less than or equal to the first burst length and a start address based on the first burst length, by coupling the plurality of transfer requests corresponding to the data retained in each of the plurality of first line buffers, based on coupling information retained in a retaining unit that includes a number of second line buffers equal to a number of the plurality of first line buffers, and outputting the transfer request after the coupling;

generating a first flag indicating whether coupling of the data amounting to 1 line of the first line buffer is completed in each of the plurality of first line buffers, based on the second judgment result, and retaining the first flag in the retaining unit;

generating a second flag indicating whether the coupling of the data is interrupted upon coupling less than 1 line of the first line buffer in each of the plurality of first line buffers, based on the first judgment result and the second judgment result, and retaining the second flag in the retaining unit, wherein each of the second line buffers retains a transfer request received last amongst the transfer requests corresponding to the data retained in one of the plurality of first line buffers, the first flag, and the second flag;

generating the first judgment result depending on whether an address of the transfer request input from the processing unit matches an address of a transfer request from a processing unit at a transfer request source matching the processing unit from which the transfer request is input, amongst the plurality of transfer requests retained in the retaining unit; and generating the second judgment result depending on a comparison result of an added value and the first burst length, wherein the added value is obtained by adding an address in an address range amounting to 1 line of each of the plurality of first line buffers, amongst the addresses of the plurality of transfer requests input from the processing unit, and a size of the plurality of transfer requests input from the processing unit, wherein the generating the transfer request after coupling computes an address after the coupling and a size after the coupling, corresponding to the transfer request after the coupling, based on the address and the size of the transfer request, the first flag, and the second flag retained in the second line buffers.

* * * * *